(12) United States Patent
Greving et al.

(10) Patent No.: US 9,082,600 B1
(45) Date of Patent: Jul. 14, 2015

(54) MASS SPECTROMETRY METHODS AND APPARATUS

(71) Applicants: Matthew Paul Greving, San Diego, CA (US); Trent R. Northen, Walnut Creek, CA (US)

(72) Inventors: Matthew Paul Greving, San Diego, CA (US); Trent R. Northen, Walnut Creek, CA (US)

( * ) Notice: Subject to any disclaimer, the term of this patent is extended or adjusted under 35 U.S.C. 154(b) by 0 days.

(21) Appl. No.: 14/153,078

(22) Filed: Jan. 13, 2014

Related U.S. Application Data

(60) Provisional application No. 61/751,915, filed on Jan. 13, 2013.

(51) Int. Cl.
  *H01J 49/02* (2006.01)
  *B65B 5/04* (2006.01)
  *B01L 3/00* (2006.01)
  *H01J 49/04* (2006.01)

(52) U.S. Cl.
  CPC .............. *H01J 49/02* (2013.01); *B01L 3/5085* (2013.01); *B65B 5/04* (2013.01); *H01J 49/0418* (2013.01); *B01J 2219/00315* (2013.01); *B01J 2219/00659* (2013.01)

(58) Field of Classification Search
  CPC ..... H01J 49/0418; H01J 49/164; H01J 49/02; G01N 33/6848; B01J 2219/00659; B01J 2219/00315; B01L 3/5085; B65B 5/04
  USPC .................. 250/282, 288; 506/6, 13
  See application file for complete search history.

(56) References Cited

U.S. PATENT DOCUMENTS

| | | | |
|---|---|---|---|
| 6,288,390 B1 * | 9/2001 | Siuzdak et al. | 250/288 |
| 6,707,038 B2 * | 3/2004 | Ellson et al. | 250/288 |
| 2008/0128608 A1 * | 6/2008 | Northen et al. | 250/282 |
| 2008/0248968 A1 * | 10/2008 | Little et al. | 506/15 |
| 2008/0261220 A1 * | 10/2008 | Cracauer et al. | 435/6 |
| 2009/0042741 A1 * | 2/2009 | Northen et al. | 506/20 |
| 2009/0159792 A1 * | 6/2009 | Day et al. | 250/282 |
| 2010/0056392 A1 * | 3/2010 | Greving et al. | 506/12 |
| 2010/0227308 A1 * | 9/2010 | Hashimoto et al. | 435/4 |
| 2010/0285972 A1 * | 11/2010 | Dubrow et al. | 506/7 |
| 2011/0212859 A1 * | 9/2011 | O'Banion et al. | 506/13 |
| 2011/0269642 A1 * | 11/2011 | Glezer et al. | 506/9 |
| 2012/0187287 A1 * | 7/2012 | Nyman et al. | 250/282 |
| 2012/0225797 A1 * | 9/2012 | Northen et al. | 506/11 |
| 2013/0053273 A1 * | 2/2013 | Juncker et al. | 506/9 |
| 2013/0336929 A1 * | 12/2013 | Iadonato et al. | 424/85.7 |
| 2014/0018701 A1 * | 1/2014 | Mao et al. | 600/583 |
| 2014/0249451 A1 * | 9/2014 | Mao et al. | 600/583 |
| 2014/0322728 A1 * | 10/2014 | Hanaway et al. | 435/7.9 |
| 2014/0336181 A1 * | 11/2014 | Yasko | 514/217 |

OTHER PUBLICATIONS

Bruker Guide to MALDI Sample Preparation, Sep. 2012.*
Hajslova, J., et al., "Challenging application offered by direct analysis in real time (DART) in food-quality and safety analysis" Trends in Analytical Chemistry, vol. 30, No. 2 201.*
Prespotted Anchorchip PAC II 384/96 HCC, Jan. 2012.*

* cited by examiner

*Primary Examiner* — Nicole Ippolito
*Assistant Examiner* — Wyatt Stoffa

(57) ABSTRACT

Methods, apparatus, compositions, systems, and articles of manufacture useful in connection with performing offsite mass spectrometric (MS) analysis of samples are disclosed. In embodiments, library samples are arrayed on MS substrates in a blinded fashion and stability-packaged for transport to an off-site location where the MS substrate is de-packaged and MS analysis is performed, enabling off-site MS analysis without requiring transport of the sample library and without compromising the confidentiality of the library contents.

21 Claims, 12 Drawing Sheets

MASS SPECTROMETRY METHODS AND APPARATUS

CROSS REFERENCE TO RELATED APPLICATION

This application claims priority from U.S. Provisional Patent Application No. 61/751,915, for Mass Spectrometry Methods and Apparatus, filed Jan. 13, 2013, the contents of which are incorporated herein by reference as though set forth in full.

STATEMENT REGARDING FEDERALLY SPONSORED RESEARCH

None

TECHNICAL FIELD

The present disclosure relates to the field of mass spectrometry.

BACKGROUND

A wide range of pharmaceutical, scientific, chemical, consumer, industrial, clinical and diagnostic markets depend on the utilization of large libraries of samples. For example, small molecule compound libraries and screens are at the heart of the pharmaceutical industry. These libraries often contain many hundreds of thousands of small molecule samples, typically dissolved in DMSO or enzyme assay buffer, in multiwell plates that occupy many cubic feet of space and often require controlled environments. The scale of these libraries makes their characterization or use in assays difficult using conventional approaches. Even simple assays measuring library integrity, stability and solubility are extremely difficult and often not performed due to the limited throughput of chemically specific analytical assays used by the group possessing the library. Therefore, it would be desirable to provide this library to a third party for analysis. However, the value of the library itself and often the intellectual property related to the library makes shipping chemical libraries and screens off-site undesirable. In addition, enzymatic assay screens using the compound library along with additional assay-specific components are highly valuable not only due to the composition of the assay but also because of the proprietary information that they contain. This inability to characterize libraries limits industrial efforts in drug and enzyme development due to lack of information on the library composition and on the stability and solubility of compounds in standard assay conditions. This may result, for example, in false negatives due to compounds not being soluble under test conditions or having degraded in storage. Analytical throughput also limits the experimental space that can be explored, again missing promising leads and slowing the pace of drug and enzyme development. These considerations make it imperative to develop technologies that enable off-site analysis, including by third parties, in a format that does not require amounts of sample large enough that the proprietary details of the assay could be reverse-engineered, and in a format that is readily transportable while maintaining the integrity of the sample library.

SUMMARY

Large sample libraries are inherently difficult or impossible to transport. Often they occupy room-sized spaces, must be kept under high refrigeration and tight environmental control, are stored and managed with massive and complex robotics systems, and contain samples obtained at great expense and embodying valuable proprietary information. Library owners are understandably unwilling to allow valuable samples off premises and risk accidental destruction, theft, or reverse engineering, and in any case the handling, storage, and transport challenges make it impracticable to do so in any quantity useful for high throughput screening.

Recent developments in mass spectrometry (MS) analysis have opened up a vast repertoire of new analytical techniques that could contribute entire new dimensions of information for sample library evaluation and screening. However, these techniques often require analytical expertise possessed only by a relatively few specialists, and specialized instrumentation that is expensive to acquire and not readily transportable.

Disclosed herein are methods, apparatus, compositions, and articles of manufacture that, in various embodiments, make possible the transport of large sample sets to an offsite location for MS analysis, in a miniaturized array format that minimizes or eliminates the risk of reverse engineering. The miniaturization is readily accomplished at the library site using easily transportable instrumentation, making it unnecessary for the sample library itself ever to leave its secure, environmentally controlled repository. Only the miniaturized array need leave the library premises, and the miniaturized samples may be tracked and results reported in a blinded fashion whereby no information regarding the exact chemical composition or provenance of the samples is divulged, yet the results are provided to those in control of the library in a format that allows them to link the mass spectrometry data to the sample identifiers thereby obtaining information on the composition and/or activities of their samples.

Offsite transport of a MS sample array poses novel stability and sample integrity problems due to the desire to accommodate standard transport services such as mail or common carrier, notwithstanding the presence of samples of unknown and variable composition and stability, the close spacing of samples to achieve desired miniaturization, the desire to enable the use of MS techniques that may entail relatively weak association of samples with the surface and/or the use of potentially problematic coatings or additives, and the risk of contamination and temperature or atmospheric changes during transport. As disclosed herein and demonstrated in the examples, the inventors have devised apparatus and methods for stability-packaging the miniaturized library arrays for transport which is effective to enable long distance transport and medium term storage while maintaining sample integrity.

The methods and apparatus disclosed herein thus enable a novel business model offering a service to owners of large sample libraries, whereby samples can be miniaturized onto an MS array at the library site, either by the customer or an MS analysis provider. The samples can then be transported to an offsite location where the required instrumentation and expertise is available for a desired MS analysis, and results can be reported back to the customer, while maintaining strict confidentiality of the nature and provenance of the samples.

In general, there are provided methods, devices, apparatus, and articles of manufacture for the general purpose of characterizing one or more aspects of the chemical composition or activities of sample libraries including, for example, but not limited to, aspects related to the development of pharmaceuticals, enzyme development, and medical diagnostics. These may include, for example, the solubilities of small molecules, the stability of small molecules, the reactivity of small molecules, composition of biofluids, compositions of tissues, composition of cells, and enzymatic activities.

An object of various aspects of the present disclosure is to provide apparatus, compositions, methods, and articles of manufacture useful for one or more of: miniaturizing large sample libraries onto mass spectrometric (MS) arrays, packaging and stabilizing the MS arrays for transport, tracking the positions of the samples on the array, transporting the MS arrays, performing offsite MS analysis on the arrayed samples, providing customer access to the MS analysis data, linking the mass spectra to library identifiers, and maintaining the confidentiality of the samples and data throughout the process.

An object of various aspects of the present disclosure is to provide high density MS arrays whereby hundreds or thousands of samples may be miniaturized onto a single MS substrate.

An object of the present disclosure is to provide a practicable ability to transport large numbers of samples for offsite analysis by a standard carrier transport service (i.e. FedEx, USPS, UPS, etc.) without excessive specialized handling during transport that is not standard to the carrier industry.

An object of various aspects of the present disclosure is to provide apparatus, compositions, methods, and articles of manufacture useful for maintaining integrity of chemical analysis by stabilizing the library and preventing or reducing the contamination of MS samples arrayed in high density on the MS substrate, whether from foreign substances or from cross-contamination between spots or otherwise.

An object of various aspects of the present disclosure is to provide customers having large sample libraries with practical and cost-effective access to MS analysis requiring specialized instrumentation and/or expertise.

An object of various aspects of the present disclosure is to facilitate transport of large sample libraries or portions thereof for offsite MS analysis in a manner that both preserves sample integrity and allows samples to leave the library or customer site only in a form providing reasonable assurance against reverse engineering or other unauthorized uses.

An object of various aspects of the present disclosure is to facilitate offsite transport of samples that may be arrayed with small separation between samples, have unknown and/or widely varying properties, or otherwise be susceptible to a risk of instability or contamination.

An object of various aspects of the present disclosure is to provide convenient and cost-effective customer access to offsite MS analysis data that may be queried using blinded tracking identifiers and/or readily incorporated into existing customer datasets.

It will be apparent to persons of skill in the art that various of the foregoing aspects and/or objects, and various other aspects and/or objects disclosed herein, can be incorporated and/or achieved separately or combined in a single device, method, composition, or article of manufacture, thus obtaining the benefit of more than one aspect and/or object, and that an embodiment may encompass none, one, or more than one but less than all of the aspects, objects, or features enumerated in the foregoing summary. The disclosure hereof extends to all such combinations. In addition to the illustrative aspects, embodiments, objects, and features described above, further aspects, embodiments, objects, and features will become apparent by reference to the drawings and detailed description. Also disclosed herein are various embodiments of related methods, devices, apparatus, and articles of manufacture. The foregoing summary is intended to provide a brief introduction to the subject matter of this disclosure and does not in any way limit or circumscribe the scope of the invention(s) disclosed herein, which scope is defined by the claims currently appended or as they may be amended, and as interpreted in the light of the entire disclosure.

Figures are not to scale unless expressly so labeled, and relative positions of objects and components are illustrative. Persons of skill in the art will recognize that many other arrangements, configurations, dimensions, and selections of components are possible and consistent with the disclosure hereof, and are in no way limited to the embodiments shown in the figures.

DETAILED DESCRIPTION

Disclosed herein are methods, apparatus, compositions, systems, and articles of manufacture useful for performing offsite mass spectrometric (MS) analysis of samples. In some embodiments, for example, a plurality of MS samples from a sample library may be arrayed on one or more MS substrates at a loading site where access to the sample library is available. The resulting arrays may then be packaged for transport in accordance with the disclosure hereof to protect the MS samples from damage or alteration, and transported to an offsite analysis location for MS analysis. Confidentiality as to the identity of the MS samples may be preserved by mapping the applied MS samples to arbitrary tracking identifiers, or by using other blinded tracking strategies, so that no confidential information on the specific composition, confidential identifiers, and/or activities of the library need ever leave the control of the library owner.

Figure 3:
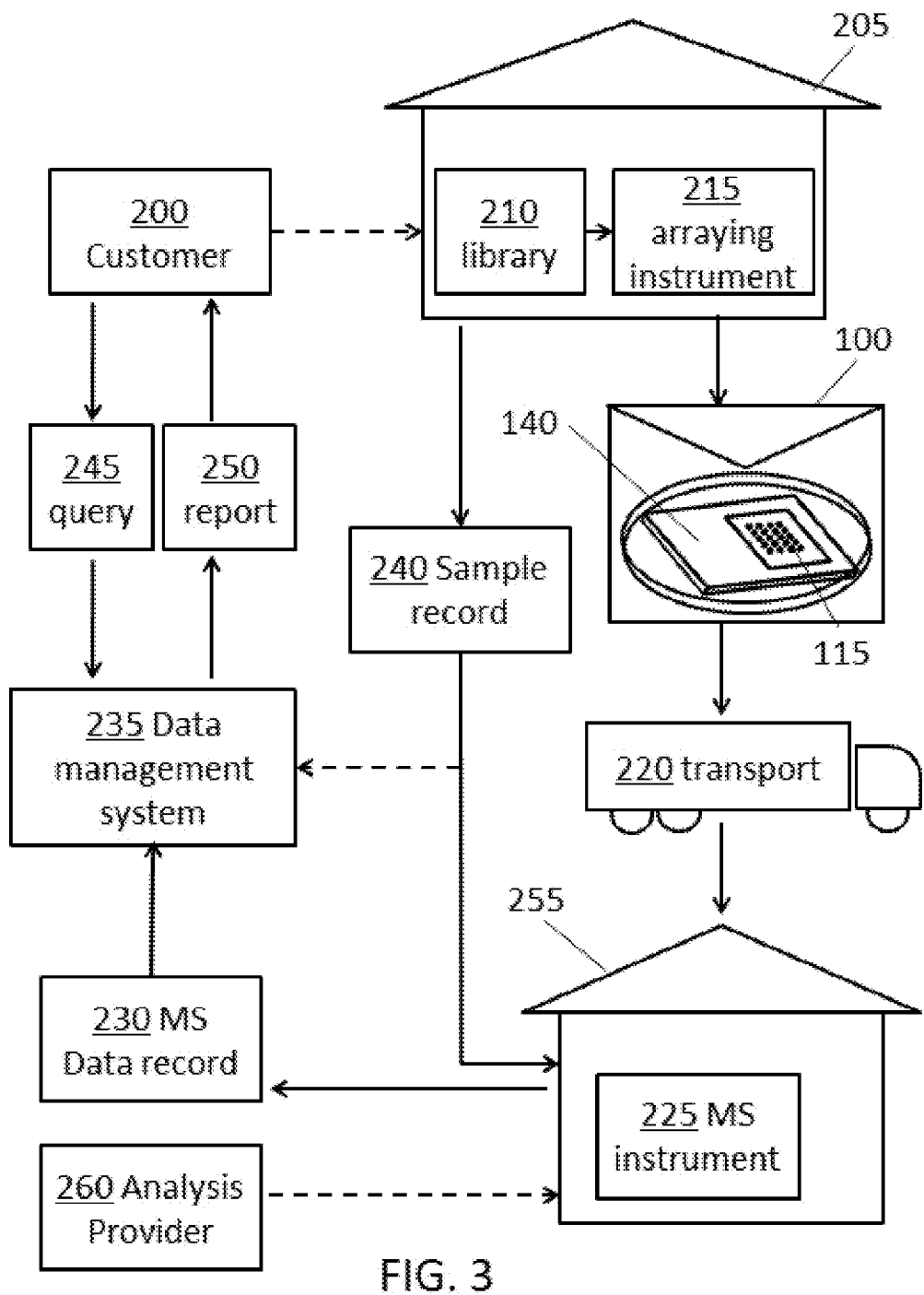
FIG. 3 shows an embodiment of an exemplary offsite MS analysis system consistent with the methods, systems, and apparatus of the present disclosure.
Figure 4:
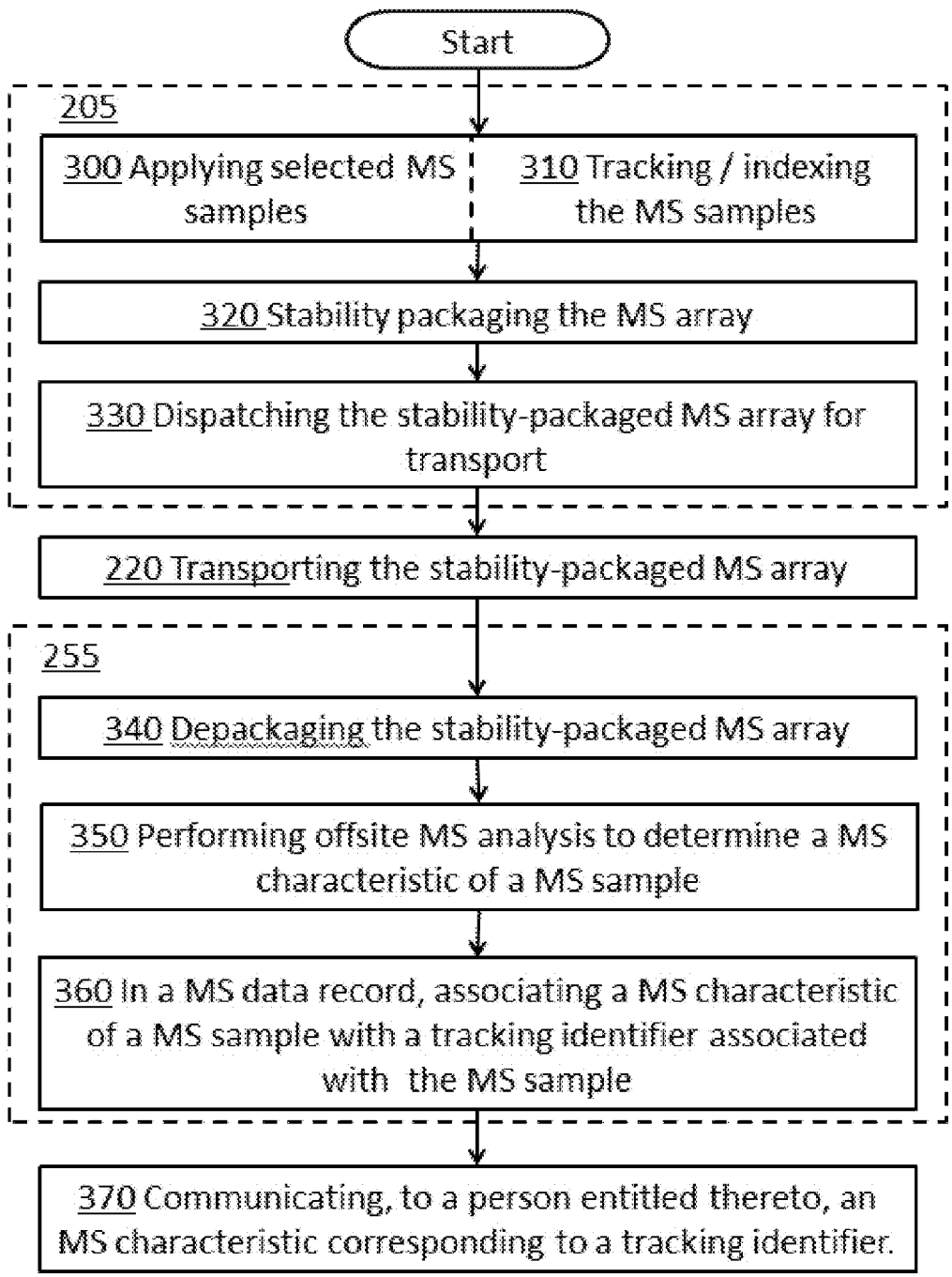
FIG. 4 depicts an embodiment of an offsite MS analysis process.

FIGS. 3 and 4 depict the broad outlines of an exemplary embodiment of a system and method for performing offsite MS analysis, of particular utility for analyzing large sample sets, employing various aspects of the disclosure hereof. At a loading site 205 under the control of a customer 200, there is present and accessible a sample library 210, such as, for example, a drug discovery library. An arraying instrument 215 as disclosed herein is made available at the loading site. Using the arraying instrument and the methods and apparatus disclosed herein, an analysis library comprising a selection of MS samples obtained from the sample library is miniaturized by applying 300 the MS samples onto an MS substrate as shown in FIG. 4 to produce an MS array 140 as shown in FIG. 3. The MS array is stabilized and packaged 320 according to the disclosure hereof to produce a stability-packaged MS array 100. An MS sample 115 applied to the MS array 140 is tracked/indexed 310 by assigning a tracking identifier to the MS sample, and, in a sample record 240, associating the tracking identifier with a descriptor by which the MS sample can be distinguished from other MS samples on the MS array. The sample record 240 is made available for use in associating 360 offsite analysis results with tracking identifiers, and a data system 235 is optionally updated with the sample record 240. The stability-packaged MS array 100 is dispatched 330 for transport 220, to an offsite analysis location 255 under the control of an analysis provider 260, at which there is available an MS instrument 225 for performing a desired MS analysis. The stability-packaged MS array is depackaged 340 and an MS analysis 350 is performed on the MS array to determine one or more MS characteristics of one or more of the MS samples, whose tracking identifier(s) is/are determined by reference to the descriptor contained in the sample record 240. The MS characteristic(s) of a sample may be associated 360 with the tracking identifier of the sample in a MS data record 230 and a data system 235 may be updated with the data record 230. The MS characteristic(s) of the MS sample and associated tracking identifier are communicated 370 to a customer 200 or other person entitled thereto. In some embodiments, this communication may include providing a customer or other person entitled thereto with access to a data record including the MS characteristic(s), and/or a report 250 thereof, in response to a query 245 including the tracking identifier of a sample of interest.

In an exemplary embodiment of various of the systems and methods disclosed herein and illustrated in FIGS. 3 and 4, offsite MS analysis is performed for a customer 200, such as, for example, a pharmaceutical company, that owns or controls a large sample library and is in need of MS analysis which may be undesirable or impracticable to perform at the library site 205. For example, the MS analysis may be of a nature requiring instrumentation not available at the site where the library is located, and/or requiring specialized expertise exceeding the customer's capabilities. The customer may employ an analysis provider 260, which may be a person or entity having expertise in the type of MS analysis desired, and having access to an MS instrument 225 of the type required. The analysis provider 260 optionally provides an arraying instrument 215 at the site where the library is located, and performs the extracting of MS samples from the sample library, the applying 300 of MS samples to the MS array(s), the indexing/tracking 310 of the MS samples, the stability-packaging 320 of the MS array(s), and the dispatching 330 of the stability-packaged MS array 100 for transport 220 by a freight forwarder or other common carrier. Following the arrival of the stability-packaged MS array 100 at the analysis site 255, the analysis provider 260 performs the depackaging 340 of the stability-packaged MS array, the offsite MS analysis 350, and associating 360 the MS data with tracking identifiers. The analysis provider then provides the customer with access to the MS analysis data, which is accessible by the tracking identifiers previously associated with the MS samples.

In various embodiments offsite MS analysis may be performed by or for a customer 200 or any other person or entity having need thereof. Various aspects of the systems and processes disclosed herein may be carried out by a single person or entity, or by multiple persons or entities acting in cooperation and/or acting as independent providers or vendors. In some embodiments, the offsite analysis 350 may be performed by, and/or an offsite analysis location 255 may be a facility owned or controlled by, an analysis provider 260, which may be a person or entity other than the customer 200 or other person or entity who owns or controls the sample library. In some embodiments, any or all of the systems and methods disclosed herein, or any part thereof, may be performed by or under the direction or control of a customer 200, an analysis provider 260, one or more employees and/or third-party contractors under the direction or control of either, or any other person or entity. In an embodiment, applying MS samples to an MS substrate 300, recording tracking information 310, stability-packaging the MS array 320, and dispatching the stability-packaged MS array for transport 330 are performed by or at the direction of a customer 200, and depackaging 340, MS analysis 350, associating results with tracking information 360, and communication of results 370 to the customer 200 or a designee of the customer are performed by or at the direction of an MS analysis provider 260.

In some embodiments, a loading site 205 may be any location where source samples are available from which MS samples may be extracted and applied to MS substrates. Often samples will be obtained from a sample library. In an exemplary embodiment, library samples are stored in multi-well plates or microtubes in a sample storage system providing temperature and environmental control, and samples may be selected and extracted robotically. The proximity to the sample storage system required for samples to be practicably available for applying to an MS array may depend upon a number of factors, such as, for example, the stability of the samples and analytes therein, the manner in which the samples are stored, availability of robotic or other facilities for handling and transporting the containers, and security and access control considerations. Thus in some embodiments, the loading site may be or include a room in which samples are stored in a sample storage system, or an adjacent or nearby room within range of practical sample availability. In some embodiments, samples may be obtained otherwise than by selection from a stored library, such as, for example, directly from a combinatorial chemistry process or from a chromatography or other separation process, or samples may be transported in well plates or other containers, in which case the loading site may be any location at which the samples are present and any required arraying instrument and any other resources required for applying MS samples to an MS substrate and stability-packaging the resulting MS array are available.

In some embodiments, an offsite analysis location 255 may be any location that is offsite from the loading site and where there is accessible a MS instrument operable for performing the analysis of interest. In some embodiments, an offsite analysis location may be a location at sufficient remove from the loading site so as to pose a risk of damage or alteration to the MS samples or substrate if the loaded MS substrate were transported to the location of the MS analysis instrument without adequate stabilization and/or protection, taking into account the nature and composition of the samples and the conditions under which they are applied, transported, and/or analyzed. In some embodiments, the offsite analysis location 255 may be in another building from the loading site 205. In some embodiments, the offsite analysis location is a facility owned or controlled by a person or entity, such as, for example, an analysis provider, other than the owner of the sample library.

In an embodiment, it will be found useful in applying the MS samples to the MS substrate to employ one or more application instruments 215, such as, for example, an acoustic deposition instrument, and/or other devices and laboratory instruments. Similarly, in obtaining MS samples from a sample library or other source of samples, and/or in stability-packaging a MS array, various materials, devices and instruments may be used. In some embodiments, any one or more of these materials, devices, and instruments, including, for example, arraying instruments, MS substrates, mounting frames for MS substrates, and materials and apparatus for stability-packaging, may be owned and/or provided in whole or part by a customer, or an analysis provider, or another person or entity. In an embodiment, the operations and methods for obtaining MS samples from library samples or other sources, applying the samples to an MS substrate, stability packaging the MS array, dispatching the MS array for transport, and related operations and processes, may be performed by persons employed or contracted by or under the direction of a customer, an analysis provider, or another person or entity.

Figure 2:
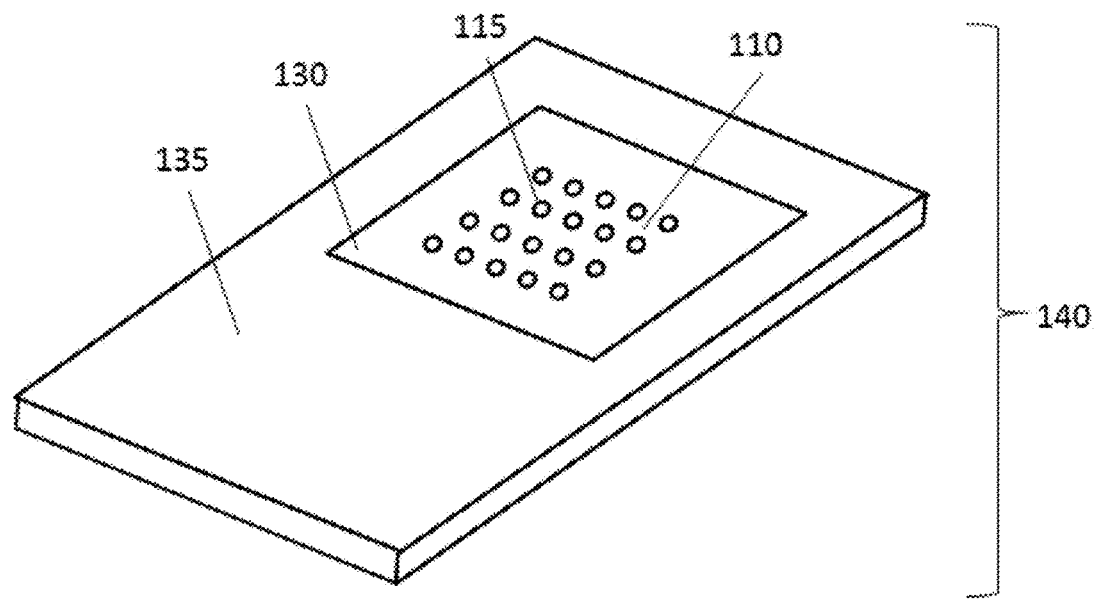
FIG. 2 is a schematic depiction of an embodiment of a MS substrate mounted in a frame.

FIG. 2 depicts schematically various general aspects of an embodiment of a MS array 140, including a MS substrate 130, MS samples 115 applied to a sample accepting region 110 thereof, and an optional mounting frame 135 in which the MS substrate may be mounted. Using the methods, apparatus, and compositions disclosed herein, MS arrays may be made having more than about 1,000, or more than about 2,000, or more than about 3,000 chemically distinct MS samples applied, representing analytes of unknown compositions and potentially widely varying properties. Array features may be less than about 250 μm diameter, or less than about 100 μm diameter, and spaced less than about 800 μm apart, or less than about 400 μm apart.

A MS substrate may be of any composition, dimensions, and geometry operable for application of a sample of interest thereto and MS analysis of the sample, and may include any of the MS substrates known to persons of skill in the art. In some embodiments, the MS samples are applied to a sample-accepting surface 110 of the MS substrate. In some embodiments the sample-accepting surface may be a substantially flat surface. In some embodiments the sample-accepting surface may be porous, and/or may be coated or doped. In some embodiments the MS substrate and/or sample-accepting surface may be composed in whole or part of one or more of: a conductor (e.g. a metal); a semiconductor (e.g. doped silicon); an insulator coated with a conductive/semiconductive material (e.g. coated glass, plastic); a thin insulator on a conductive surface such as a 50 um thick coverslip on stainless steel surface; or any other material having or contributing to desired sample-application and/or MS analysis properties.

In some embodiments as illustrated schematically in FIG. 2, a MS substrate 130 may be mounted in and/or affixed to a frame or mounting structure 135. MS substrates may be fabricated or cut from the raw material into numerous geometries. In some embodiments, the dimensions and geometry of the MS substrate and/or the frame or mounting structure are compatible with an instrument for applying samples to the MS substrate, a MS analysis instrument, a laboratory robotics instrument, or other instrument with which compatibility is desired. In some embodiments, the dimensions and geometry of the MS substrate and/or the frame or mounting structure conform to or are compatible with a standard Society for Biomolecular Screening (SBS) footprint, such as, for example, 127.76 mm long by 85.48 mm wide (www.slas.org/education/standards/ANSI_SBS_1-2004.pdf), or a standard microscope slide dimension such as 75 mm long by 25 mm wide. Conforming to SBS geometries enables compatibility with a wide variety of robotics, mass spectrometers, sample handlers, autosamplers, and other standard instrumentation. An advantage of mounting a MS substrate in a mounting frame is that the dimensions of the MS substrate can be determined according to the number of samples and surface area required or other criteria of interest, while maintaining compatibility with other instruments via the frame or mounting structure, thereby allowing more effective use of the substrate material.

In some embodiments, it will be found useful to employ as a MS substrate nanoporous silicon coated with a liquid initiator that fills the pores (i.e. Nanostructure-initiator mass spectrometry, NIMS). In some embodiments an MS substrate may be prepared or treated according to any preparation or treatment modality operable to produce desired properties, which may include any one or more of the MS substrate preparation or treatment modalities known to persons of skill in the art as suitable for the types of MS analysis techniques described in this application. This may range from simple planar substrates including but not limited to, silicon and other semiconductors, gold, steel, stainless steel, glass, polymeric materials especially conductive polymers, laminated materials etc. to more complex structured surfaces. A wide range of structured surfaces are used in mass spectrometry including but not limited to, thin layer chromatographic surfaces, microfabricated silicon or other semiconductor surfaces, porous materials including silicon and other semiconductors and combinations of planar and structured surfaces including those coated by other materials. An example of planar coated surfaces would be stainless steel coated with sinapinic acid or other MALDI matrix materials. By way of example of a coated structured surface, the MS substrate may be prepared generally according to the protocol for producing NIMS surfaces as described in Woo H-K., Northen T. R., Yanes O., Siuzdak G. Nanostructure-Initiator Mass Spectrometry (NIMS): A protocol for preparing and applying NIMS surfaces for high sensitivity mass analysis. Nature Protocols 3, 1341-1349 (2008), which may be adapted to accommodate a desired chip geometry and surface chemistry.

In some embodiments, coatings and/or sample additives may be employed, which may include any coatings or additives operable singly or in combination to improve spot placement, spot homogeneity, and/or spot reproducibility, and/or otherwise enhance the printed array quality; to improve and/or facilitate ionization of sample; to improve any property of the mass spectrometry readout such as, for example, sensitivity, quantitation, or reproducibility; or to improve or modify any other property or characteristic of interest. In some embodiments, for example, a hydrophobic fluorous coating, as used in the production of NIMS chips, may be employed to produce high contact angles (e.g. >90 degrees) with aqueous sample droplets, which results in a MS sample spot that covers a smaller (e.g. 250 microns or less or 100 microns or less) diameter. In some embodiments coatings and/or surface treatments are employed to improve sample distribution homogeneity within a spot. In some embodiments a degree of sample distribution homogeneity is obtained such that independent samplings across a spot have a normalized intensity coefficient of variation less than 50% for a known analyte in the sample.

In various embodiments, MS samples 115 may be or include or be sampled or made from any one or more materials or substances desired to be analyzed by mass spectrometry and capable of being applied to a MS substrate. In some embodiments an MS sample is, includes, or is derived from an aliquot of a sample present in a combinatorial or other sample library, such as, for example, a small organic molecule library, enzymatic reactions, drug libraries, libraries of biological materials obtained from tissues, biofluids, or microorganisms, peptide libraries, protein libraries, polymer libraries, biopolymer libraries, libraries obtained from combinatorial chemistry approaches, and small molecule libraries with one or more molecule conforming to Lipinski's Rule of Five. These libraries may, for example, be composed of small molecules, natural and/or synthetic, such as used for the purposes of drug development, enzyme development or medical diagnostics. Libraries may be the result of synthetic and/or combinatorial chemistry and/or be obtained from plant, microbial, or animals including human tissues and biofluids. Libraries may also be composed in whole or part of activity assay mixtures that include proteins, co-factors, reaction substrates and/or other necessary components to assess activity, such as microsomes or cells.

Commonly, compound libraries used in, for example, drug development and research, may include a large number of individual samples, which may number in the thousands, tens of thousands, hundreds of thousands, or more, with each sample separately stored. Often library samples are dissolved or suspended in a buffer or solvent, and disposed in well plates or other containers known in the art, which are stored in a carefully controlled environment and handled and accessed robotically. A stored sample library may easily occupy a room-sized volume, part of which comprises storage racks, associated environmental control systems, and robotic handling equipment that is not readily movable. Therefore, for a large library-derived sample set to be analyzed by MS techniques not available at the library location, it is of great practical utility to substantially miniaturize the sample set, preferably in a way that also provides for maintaining stability and integrity of the samples. The methods, apparatus, and compositions disclosed herein may be employed to prepare a miniaturized sample set wherein sample volumes are reduced from on the order of at least tens of microliters to on the order of nanoliters, with samples representing the contents of large well plates miniaturized onto readily transportable and stabilizable chips similar in size to standard microscope slides. The full mass spectrometric informational content of a large sample set occupying on the order of cubic meters of storage may be reduced to MS arrays occupying less than $1/20$ of the volume occupied by the source library, or less than $1/100$ the volume, or less than $1/1000$ the volume, or less than $1/10,000$ the volume. In this way the packaging volume of a sample library or subset thereof (that is, the volume required to be packaged if transport is desired, including the samples and their containers) may be markedly reduced. In general, using the methods and apparatus disclosed herein, the packaging volume required to package a sample library or subset thereof for transport may be reduced from that required for packaging multiple well plates or sample tubes to the volume occupied by an MS array of dimensions as disclosed herein, for a reduction in packaging volume of 20:1, or 100:1, or 1000:1, or 10,000:1, making practicable the transport of sample libraries would otherwise be so large and unwieldy for convenient packaging and shipping.

In some embodiments, MS arrays having very high total complexity are produced, stability-packaged, transported, and/or offsite analyzed. The complexity of an MS array may be expressed in terms of the number of hyperspectral dimensions present, which may be computed as the mass range observed divided by the resolving power of the analysis, where the mass range observed is the difference between the highest and lowest masses observed, and the resolving power is the smallest difference between two masses that can be resolved as distinct peaks. The hyperspectral complexity of an MS array may be expressed as the number of hyperspectral dimensions for each spot or MS sample, summed over all the MS samples present on the MS array. In general, as complexity increases, the need increases for the precautions disclosed herein against alteration and/or contamination of MS samples and associated MS substrate compositions, coatings, matrices, etc., while awaiting analysis, since the information-degrading effect of any such contamination or alteration is likely to be relatively greater in comparison to the information present corresponding to the characteristics sought to be measured. The methods, apparatus, compositions, and articles of manufacture disclosed herein may be used to produce, stability-package, transport, and/or perform and report offsite MS analysis on MS arrays having a total hyperspectral complexity of more than 10,000, or more than 100,000, or more than 500,000, or more than 1,000,000.

In various embodiments MS samples applied to MS substrates may include any one or more compositions and/or analytes capable of having an MS characteristic measured or estimated by MS analysis according to any of the methods disclosed herein or known in the art. In some embodiments MS samples may be, include, or be sampled or made from, for example, one or more liquids, gases, solutions, emulsions, slurries, colloidal mixtures, gels, powders, suspensions of sample material or other suspended entities, and/or biological fluids, such as, for example, blood, serum, cerebrospinal fluid, or urine. In some embodiments MS samples may be sampled or derived from an organism, such as, for example, an animal, a microbe, a plant, or a parasite; or from a tissue, tissue culture, bacterial culture, or other biological source, such as, for example, a human cell culture extract, a tissue extract, lysed cells, or homogenized tissues. Analytes whose MS characteristics may be desired to be analyzed by MS analysis, present in MS samples in various embodiments, may include, for example, one or more analytes selected from organic molecules, inorganic molecules, metals, ceramics, proteins, enzymes, biomarkers, transcription factors, membrane proteins, cytoskeletal proteins, peptides, polypeptides, nucleic acids, nucleic acid analogs, metallo-proteins, chemical catalysts, metallic groups, antibodies, cells, ions, ligands, substrates, receptors, biotin, hydrophobic moieties, alkyl chains, phenyl groups, co-factors, or any other type or class of analyte at least one MS characteristic of which is capable of being measured or estimated by MS analysis.

In some embodiments MS samples may optionally include or contain substances having any chemical, physical, and/or biological properties deemed useful, such as, for example, reagents, buffers, solvents, surfactants, wetting agents, lubricants, drugs, etc. In some embodiments, MS samples may include or have added thereto one or more additives such as organic alcohols (e.g. isopropanol, methanol) or poly-alcohols (e.g. glycerol) or other organic solvents. Additives such as, for example, the foregoing may be usefully employed to stabilize the sample droplets and improve dried array spot homogeneity and/or increasing mass spectrometry detection quality/sensitivity and/or reproducibility. In some embodiments, such additives may include, for example, a quantitation standard, a mass accuracy standard, a signal to noise enhancer, a pH modifying additive, a solubility modifying additive, an ionization enhancing additive, a derivatization material, a volatility modifying additive, an adduction material, and/or a label, molecular bar code, or tag. In some embodiments, MS samples may be dissolved, suspended or mixed in, or otherwise associated with one or more solvents, buffers, pure water, mixtures of water and organic, or other substances, such as DMSO. A solvent may be polar or non-polar and/or may be volatile, such as a solvent having a boiling point below ambient temperature and pressure, or may be non-volatile. In some exemplary embodiments it will be found advantageous to employ MS samples dissolved, suspended, and/or mixed in DMSO, alcohol:water mixtures, and/or standard chemical buffers. In some embodiments an MS sample may include and/or be derived or sampled from an extract, such as for example an alcohol extract, a chloroform extract, an ether extract, a DMSO extract.

MS samples may be mixed with reagents to improve their desorption and/or ionization and/or surface wetting characteristics. Common materials used for this purpose are photoreactive compounds including but not limited to MALDI matrix materials, common examples include 3,5-dimethoxy-4-hydroxycinnamic acid (sinapinic acid), alpha-cyano-4-hydroxycinnamic acid (CHCA), 2,5-dihydroxybenzoic acid (DHB), picolinic acid. They may also include a wide range of acids or bases (e.g. trifluoroacetic acid, ammonium bicarbonate, etc.). Nanomaterials can also be used, such as, for example, gold nanoparticles, cobalt nanoparticles. Additives that can also be used to enhance surface wetting resulting in more even sample deposition include for example colloidal particles, surfactants, and organic solvents.

A plurality of MS samples may be applied to an MS substrate to produce an MS array. MS samples may be applied to an MS substrate by any method or modality operable to produce on the MS substrate a deposition of sample material capable of analysis therefrom by mass spectrometry and having volume, spot dimensions and spacing, and other characteristics as suitable for an application of interest. In some embodiments, MS samples may be applied to the MS substrate by application methods such as, for example, contact printing, piezo printing, pipette printing, or ink jet printing. In some embodiments it is preferable to apply MS samples to the MS substrate using non-contact application methods such as acoustic printing, as described in further detail in the examples below, to avoid contamination, and facilitate high-throughput processing and high density arraying. In some embodiments, MS samples applied to an MS substrate are immobilized and/or positionally constrained thereon in any manner operable to produce an array of stability adequate for an application of interest. In some embodiments MS samples are immobilized and/or positionally constrained by, for example, a chemical interaction, such as a covalent or ionic bond with the MS substrate or a coating or linker; by an affinity interaction with the MS substrate or an affinity reagent; and/or by a physical interaction such as, for example, adsorption, trapping, or hydrophobic or van der Waals interactions.

Figure 13:
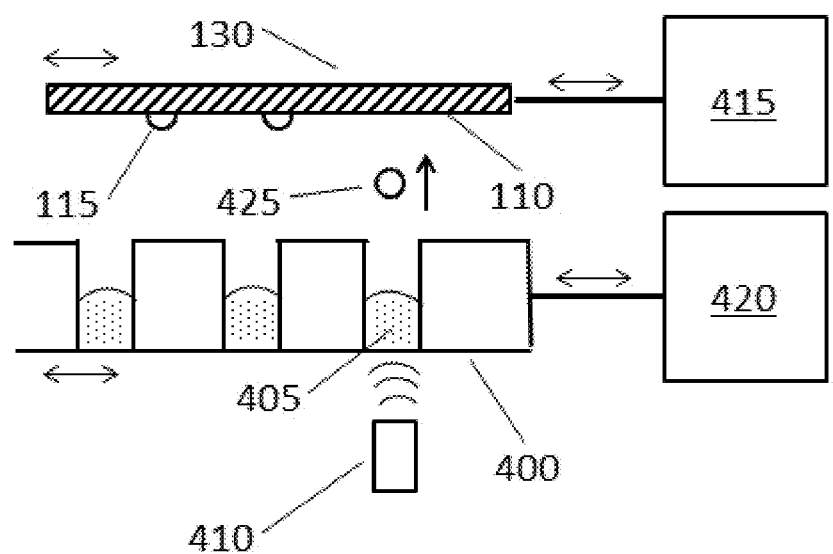
FIG. 13 depicts schematically the arraying of MS samples onto an MS substrate by acoustic deposition.

In some embodiments, acoustic printing of samples onto the sample accepting surface will be found to produce superior results with high-throughput mass spectrometry readout of high-density sample arrays. In an embodiment as depicted schematically in FIG. 13, MS samples 115 are applied to a MS substrate 130 by acoustic printing. The sample accepting surface 110 of the MS substrate is positioned facing the well openings of a film bottom well plate 400 or other container providing an acoustically transmissive path for acoustic energy. An acoustic horn 410 emits an acoustic pulse into sample 405 present in the well or container, causing a droplet of sample 425 to be ejected toward the sample accepting surface of the MS substrate. Actuators 415, 420 may be provided to position the MS substrate and the well plate or other container, respectively, relative to each other so as to deposit sample droplets at predetermined positions on the MS substrate. In some embodiments the actuators are controlled by a computer and/or robotic stages are used so as to apply MS samples at predetermined positions and/or in a predetermined pattern as specified in a computer file. Acoustic printing is a completely non-contact printing method that utilizes an acoustic horn (transducer) 410 positioned below a reservoir or well (such as a microtiter plate 400) to emit a focused sound wave that in turn ejects a droplet 425, typically in a volume/size range on the order of tens of picoliters to tens of nanoliters. An advantage is that the sample never contacts the printing apparatus, which eliminates the need for disposable print heads/tips or wash solvent. The non-contact nature of acoustic printing eliminates cross contamination from the printing apparatus, which is important for high-sensitivity detection such as mass spectrometry. An exemplary embodiment using of acoustic printing for arraying of MS samples onto an MS array is described in Example 7.

Sample pitch is determined by a range of factors including the MS surface and MS sample physio-chemical properties, the volume of sample deposited, and the sample deposition instrumentation, amongst other factors. For example, using the hydrophobic fluorous liquid coated NIMS MS samples for printing MS samples containing organic solvents will result in lower contact angles and larger spot diameters than using aqueous samples. In this case, the minimum pitch would be increased to prevent potential mixing of spots. Similarly, depositing larger sample volumes will result in larger spot diameters and will result in larger minimum pitches to prevent spot mixing. In other cases the minimum pitch will be limited by the capabilities of the deposition instrumentation. For example, a typical 8-span liquid transfer robot may have a minimum lateral resolution of about 500 µm and a minimum pipetting volume of hundreds of nanoliters, limiting the pitch to about 500 µm. The preferred deposition method of acoustic transfer systems can print sub-nanoliter volumes with capabilities of sub-500 µm pitches. Printing of 1 nl or smaller volumes of MS samples with contact angles of about 90 degrees or higher using acoustic transfer system can achieve high density MS arrays that most efficiently enable transport of large libraries. The resulting high density MS arrays typically require control environments to prevent cross-contamination. Rehydration of the arrays during transport due to condensation (e.g. cold conditions typical of air-shipping) combined with vibration can result in mixing of samples invalidating the experimental results. Therefore, it will be found useful with the MS arrays to utilize the described shipping systems In some embodiments and/or for some applications it may be found useful in applying an MS sample to an MS substrate to apply a solid phase analyte or carrier, such as, for example, a frozen sample or fraction thereof, or a bead or nanoparticle.

In some embodiments an MS sample is applied in whole or part as a gas or aerosol, such as by a nebulizer print head that nebulizes a liquid into a gas or aerosol that is then captured by the surface. Application of sample as a gas or aerosol may offer advantages including improved intra-spot homogeneity (since non-uniform drying effects are minimized), reduced inter-spot cross-talk (since the possibility of migration of liquid droplets is avoided), and potentially improved signal-to-noise due to reduction of solvent suppression on the surface (volatile solvent evaporates faster than sample analytes, therefore nebulized solvent goes away into the surrounding air while less volatile nebulized analytes are captured on the surface as a sample spot).

In some embodiments and/or applications it will be found useful to apply an MS sample wherein a reaction or interaction of interest is occurring or has occurred. For example, in some embodiments an MS sample may include any two or more interacting entities of interest such as, for example, a protein interacting with a small molecule, a peptide, an oligosaccharide, a nucleic acid, another protein, or a cofactor; an enzyme interacting with a substrate; or a metabolite undergoing or produced as a product of a reaction with another species. In some embodiments an MS sample includes two or more analyte entities that are combined on the MS substrate, such as by sequential or simultaneous application of two or more compositions to the same MS substrate locus. In some embodiments a reaction or interaction occurring in an MS sample is quenched, such as by applying a quenching substance and/or using any of a number of methods common to the art, including, for example, temperature shifts, pH shifts, and/or addition of organic solvents to the MS sample after a predetermined reaction or interaction time.

It being one of the objectives of the disclosure hereof to provide methods and apparatus whereby MS analysis can be performed on sensitive and/or confidential samples at a location not under the control of the owner of the samples, while protecting the identity of the samples from unauthorized disclosure or discovery, in some embodiments, MS samples are blinded by applying them to the MS substrate in a manner and/or in quantities such as to prevent, impede, and/or make impracticable the analysis of the MS samples by modalities or techniques other than the intended MS analysis. Thus an unauthorized person, even if in possession of the MS array, would be able to obtain, at most, the information obtainable by MS analysis, and would be unable to determine the exact chemical structure and/or identity of the analyte(s) present. In some embodiments, samples are applied at a center to center distance of less than about 1 mm, or less than about 500 microns. In some embodiments the volume of an MS sample applied to a MS substrate is less than about 1 µL, or less than about 500 nL, or less than about 100 nL, or less than about 10 nL, or less than about 1 nL or less than about 300 pL, or less than 100 pL, or less than about 10 pL. In some embodiments a MS sample applied to an MS substrate has an analyte concentration of less than about 10 mg/mL, or less than about 1 mg/mL, or less than about 100 µg/mL, or less than about 10 µg/mL, or less than about 1 µg/mL, or less than about 100 ng/mL, or less than about 10 ng/mL, or less than about 1 ng mL, or less than about 100 pg/mL, or less than about 10 pg/mL, or less than about 1 pg/mL, or less than about 100 fg/mL, or less than about 10 fg/mL, or less than about 1 fg/mL, depending in part upon the concentration of an analyte of interest in a sample source. For example, an organic molecule in a combinatorial library sample may be present at relatively high concentration, while a biomarker may be present in a sample at very low concentration. A particularly challenging need addressed by some embodiments as disclosed herein is the need for methods and apparatus operable to miniaturize, stabilize, and perform offsite analysis on samples wherein, depending on the sample sources and other considerations, the concentrations of an analyte of interest may range very widely. In some embodiments an analyte molecule to be characterized by MS analysis present in a MS sample applied to a MS substrate has a mass less than about 300,000 Da, or less than about 30,000 Da, or less than about 3,000 Da.

In some embodiments, by limiting the volume and/or analyte concentration of the MS samples, the quantity of analyte material present in a sample may be limited to a quantity as to which NMR analysis or other non-MS analysis modalities are impracticable; by disposing the MS samples on the MS substrate at high density and/or in close proximity, extraction of a sample for an unauthorized analysis is made more difficult or impracticable. The practicability of reverse engineering analysis of samples depends upon the determination, effort, and resources applied, and a practicable blinding strategy should therefore aim for reasonable deterrence commensurate with the likely risk. Currently NMR analysis of small organic molecule samples of mass on the order of about 0.1 mg is generally capable of producing acceptable signal to noise ratios (for $^1$H acquisitions, which, coupled with MS analysis might reveal an undesirable level of information for reverse engineering), and, depending on the analyte and the instrumentation used, as little as 15 µg may be sufficient. However, NMR analysis of a MS sample applied to a MS array would require removal of sample from the substrate, likely resulting in some loss of sample. Thus in various embodiments, a useful level of deterrence can be achieved by limiting the total mass of analyte in each MS sample applied to a MS array to less than 0.1 mg, or less than 50 µg, or less than 15 µg. Further deterrence can be achieved by arraying the MS samples in close proximity to each other. For spots closer together than about 1 mm, or for even greater deterrence, less than about 0.5 mm, as disclosed herein, elution of a sample without cross-contamination from adjacent samples becomes more difficult and other means of removing the samples from the array would likely have to be employed. Thus in various embodiments a useful improvement in deterrence against possible reverse engineering can be obtained by applying MS samples at a separation of about 1 mm or less, and improved further at a separation of about 0.5 mm or less, and still further at a separation of about 0.25 mm or less. At extremely close feature spacings, the risk of cross-contamination between spots, particularly in the presence of any moisture, humidity, or volatilization, increases, potentially raising a need for more careful environmental control during handling, packaging, and transport.

In some embodiments, a MS sample applied to an MS substrate is tracked and/or indexed to associate the MS sample with information by which its identity and/or provenance can be tracked by a person having authority to do so. A MS sample may be tracked and/or indexed by any method or modality and/or using any apparatus operable to maintain an unambiguous record or trace of the identity and/or provenance of the sample. In some embodiments, the identity of the sample is encoded and/or recorded via a unique tracking identifier associated with the sample. In some embodiments where it is desired to preserve confidentiality regarding the identity of a MS sample, a tracking identifier should preferably be a non-informative identifier that does not expose to an unauthorized person information regarding the identity, nature, or provenance of the MS sample or from which these might be inferred. In some embodiments, for example, randomly assigned or encrypted identifiers may be employed as tracking identifiers. In some embodiments, a tracking identifier of a MS sample may include or be derived from a sample ID of a library sample from which all or part of the MS sample was obtained, or the MS surface ID and x-y position on the array or other position descriptor, or may be an arbitrary identifier such as a random number or key assigned to the MS sample, in which case a record may be made associating the arbitrary identifier with other information sufficient to allow a person entitled thereto to determine the identity and/or provenance of the sample, its composition, and/or another characteristic of interest. A tracking identifier may be associated with another data item in any manner operable to allow retrieval of the data item using the tracking identifier, such as, for example, by creating or updating a record, which may be a computerized or electronic record, containing both the tracking identifier and the data item, or by employing the tracking identifier as a key in a database, hash, or other data structure containing the data item as a value associated or capable of being associated with the key, or by incorporating, conflating, and/or encrypting the data item into the tracking identifier itself.

Figure 5:
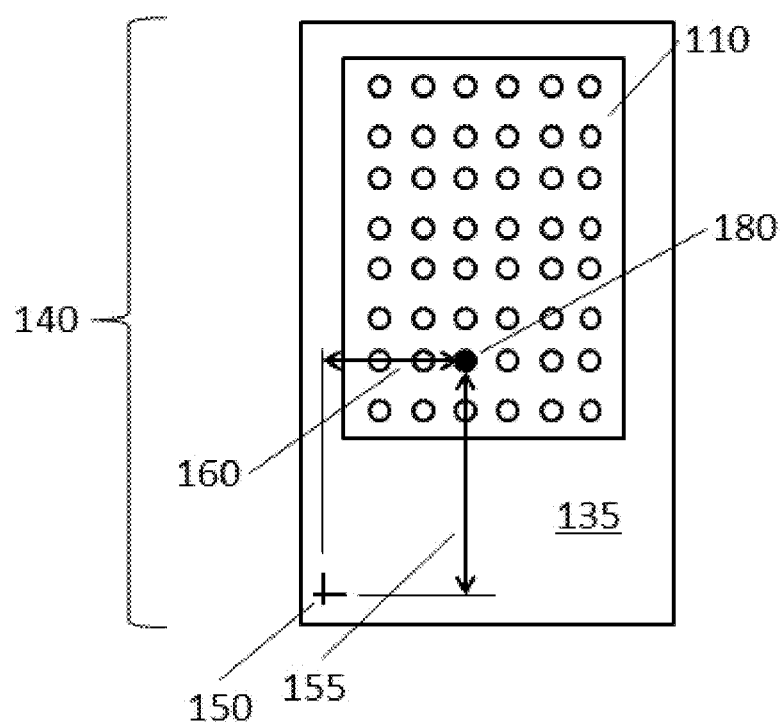
FIG. 5 depicts an embodiment of an MS substrate and a frame including a fiducial mark.

In some embodiments, it will be found useful in tracking and/or indexing a MS sample to apply the MS sample to a trackable position on the MS substrate, and/or to associate a descriptor of the position of the MS sample on the MS substrate with a tracking identifier of the MS sample. A trackable position on the MS substrate may be any position capable of being individually identified and/or addressed, such as, for example, a position whose coordinates relative to a known datum are known or measurable, or a position that can be determined from characteristics of the MS sample applied to the MS substrate or of the pattern of samples or other MS samples therein. A descriptor of the position of the MS sample may include any descriptor providing information for distinguishing an MS sample from other MS samples and/or addressing an operation to a particular MS sample (such as, for example, making an MS measurement thereon, applying additional material thereto, or performing a quality control evaluation thereon). For example, in some embodiments, a descriptor of the position of an MS sample may include a distance, angle, or other metric of the position of the MS sample relative to another known position, such as the position of a fiducial mark on the MS substrate or a frame in which it is mounted; or relative to one or more other MS samples; or relative to a structural feature of the MS substrate or frame, such as, for example, an edge or corner. In an embodiment as illustrated in FIG. 5, a fiducial mark 150 is provided on the mounting frame 135 in which an MS substrate 130 is mounted, and the fiducial mark serves as an origin of a coordinate system. A fiducial mark may be any fixed and detectable mark or feature useful for positioning and/or aligning a MS substrate or mounting frame and/or fixing a position of any object, such as a MS sample, relative thereto. The respective distances 155 and 160 of a MS substrate position of interest 180 from orthogonal axes of the coordinate system uniquely specify the position of the MS substrate, and may be incorporated in a position descriptor. In some embodiments where an acoustic deposition instrument or other robotic arraying instrument or movable stage is employed to position the arraying instrument relative to the MS substrate, the positions at which MS samples are applied may be obtained from positional readouts from the instrument(s) and/or the instruments' associated software.

In some embodiments, a position descriptor includes the respective distances of the MS sample from two or more fiducial marks or from one or more coordinate axis or other datum determined thereby, and/or the fiducial marks may be usefully employed to assist in alignment and registration of the MS substrate or frame in a spotter, MS instrument, lab robot, or other instrument. Exemplary embodiments are described in the Examples below. In some embodiments, a position descriptor may include the position of an MS sample relative to other MS samples, and a particular MS sample may be tracked or identified by, for example, oversampling, determining the pattern of spots on the MS substrate, and tracking or identifying the MS sample of interest by its position in the pattern. In some embodiments wherein a distinguishing MS characteristic of one or more MS samples is known, an MS sample may be tracked, indexed, and/or identified in whole or part by observing the presence or absence of the distinguishing MS characteristic.

Figure 6:
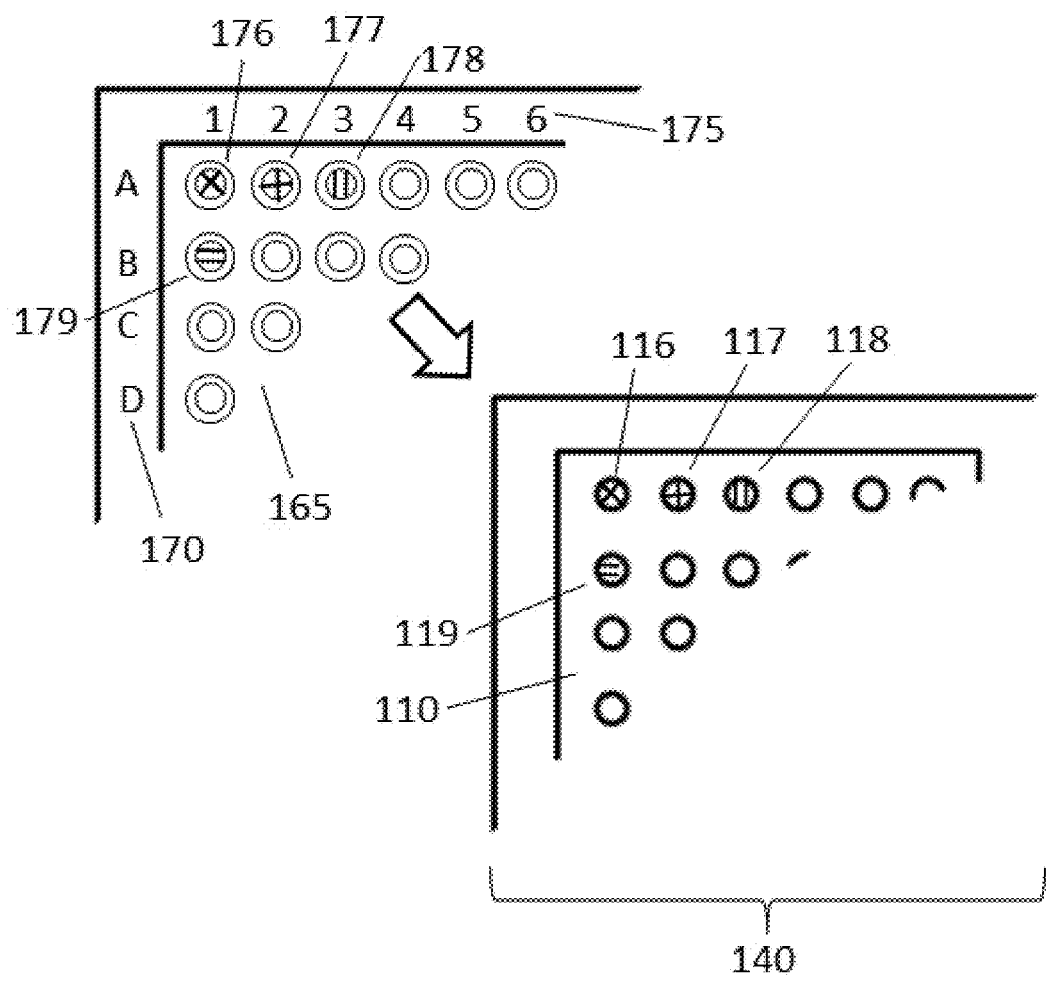
FIG. 6 depicts an embodiment of an MS array including MS samples applied at trackable loci.

In an embodiment as depicted schematically in FIG. 6, wherein MS samples are obtained from a sample library disposed in a well plate 165, MS samples may be tracked and indexed by applying the MS samples in a pattern having a known or determinable relationship with the positions of the library samples in the well plate. Thus, for example, MS samples 116, 117, 118, 119 may be arrayed on an MS substrate 130 in a pattern corresponding to the positions of the respective library samples 176, 177, 178, 179 from which the MS samples are obtained. It will be apparent that an exact correspondence is not required, and that many other mappings are possible, provided that a relationship exists whereby the position of a MS sample on the MS array can be mapped back to its source. Alternatively, a tracking identifier may include or be derived from the positions of the library samples in the well plate, such as, for example, the row and column designators of samples in a standard well plate having row and column markers 170 175, together with a plate identifier.

In some embodiments, MS samples may be tracked or indexed based on any property or characteristic operable for uniquely identifying a sample, such as, for example, by the presence of one or more tags or other chemical or physical identifiers such as a molecular bar code or tag which may be detectable in a mass spectrum of the sample. In some embodiments, for example, MS/MS fragmentation may produce a fragmentation pattern from a spiked internal standard or analyte giving highly specific identification of a sample spot. MS samples may also be indexed or tracked based on an orthogonal analysis system, for example absorbance or fluorescence or phosphorescence or radiotracers. For example, inclusion of a fluorescent dansyl dye in known MS array positions would enable a rapid fluorescent image to map out the array for subsequent MS analysis.

Figure 1:
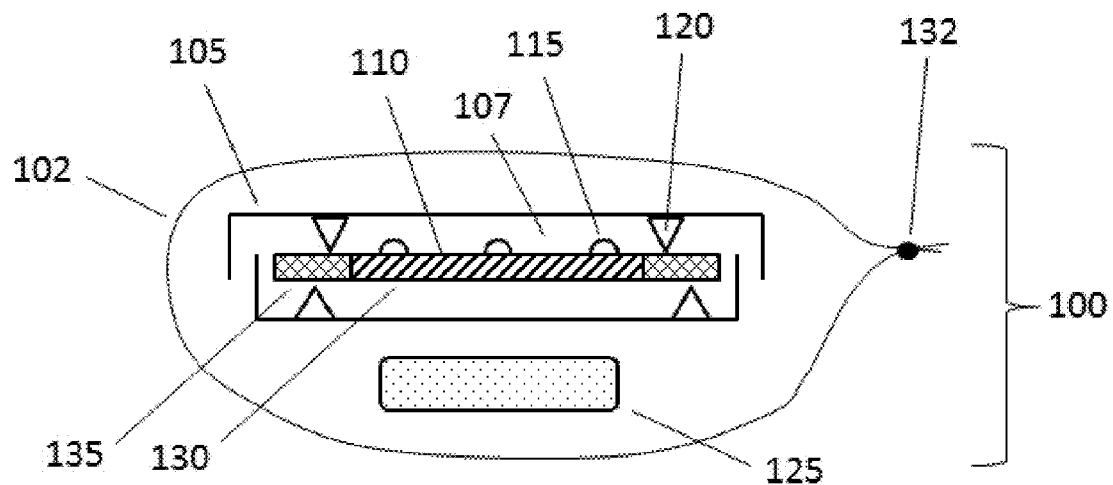
FIG. 1 is a schematic depiction in cross-section of an embodiment of a stability-packaged MS array.

In an embodiment, as illustrated schematically by way of non-limiting example in FIG. 1, there is provided a stability-packaged MS array including an MS substrate 130, having a plurality of MS samples 115 applied thereon, an enclosure 100 surrounding the MS samples, and a barrier 105 isolating the MS samples from physical contact. In some embodiments a stability-packaged MS array further includes an environmental control system 125 disposed and configured to condition the environment within the enclosure, or at least the environment immediately proximate to the MS samples.

In an embodiment as illustrated in FIG. 1, a stability-packaged MS array includes an enclosure 102 surrounding the MS samples. The enclosure may be of any material, composition, dimensions, geometry, and/or configuration operable to establish a region surrounding the MS samples wherein the environment to which the MS samples are exposed may be controlled. Care should preferably be taken that any portions of the enclosure, and any other components of the packaging exposed to the MS samples or the environment in which they are enclosed, are composed of materials that do not emit vapors, gasses, particulates, or other contaminants and are maintained free of any such materials or contaminants and/or cleaned to remove them. In some embodiments as illustrated in FIG. 1, the enclosure 102 may be a sealed enclosure, such as a Mylar bag sealed with a heat seal 132, enclosing the entire MS substrate, the MS samples, and optionally other components. In some embodiments the enclosure may be sealed over or against the MS substrate 130 and/or frame or mounting structure 135. In some embodiments the enclosure may be wholly or partially impermeable and/or impervious to gasses and/or vapors. Indicators may be included on or in the package to indicate mistreatment during shipment, which may in various embodiments include any device, material, or component operable to disclose the occurrence of a condition of interest, such as, for example MonitorMarks available from 3M which provide a visual history of time/temperature exposure [solutions.3m.com/wps/portal/3M/en_US/Microbiology/FoodSafety/productinformation/productcatalog/?PC__7_RJH9U523003DC023S7P92O3O87000000_nid=NFNLL5PG88beX2JZNTSLT SLTgl].

In some embodiments the enclosure may be fully or partially evacuated. In some embodiments the enclosure may be charged with a non-interactive gas or fluid, which may preferably be of a composition that does not react chemically with or otherwise contaminate or alter an MS sample or the MS substrate in a manner that would introduce an artifact or inaccuracy in a MS analysis performed on the MS sample. In some embodiments a non-interactive gas or fluid may be or include an inert gas, such as, for example, argon, or a gas that is not chemically reactive with an MS sample, such as, for example, ultra-high purity (UHP) nitrogen. It will be apparent to persons of skill in the art that the reactivity of a particular gas or fluid with an MS sample may depend upon the composition of the MS sample, and selection of an appropriate non-interactive gas or fluid should be guided by the known chemical and physical properties of the gas or fluid and the MS sample. In general, and in many embodiments, it will be found useful to avoid or reduce exposure of the MS samples and/or MS substrate surface to moisture, humidity, particulates, solvents and their vapors, and contaminants, since these may mix, react chemically, or induce a state change in the MS samples or MS substrate, and/or may cause MS samples to spread, interact and/or cross-contaminate with other nearby MS samples, adsorb contaminants from the surrounding air or gas, and/or change spot morphology. Contamination can occur from the contact of the MS surface with gas, liquid, or solid materials that affect or interact with or deposit materials onto the mass spectrometry surface and/or MS samples. An example of gas phase contamination is the adsorption of small molecules from the air by the nanostructure-initiator surface reducing the performance of the assay. Gas and liquid phase contamination may, for example, occur in situations where hygroscopic materials printed onto the surface absorb water vapor or where water condensation forms directly onto the surface; in both cases the water can mix spots, degrade analyte, and be otherwise detrimental to assays. Exposure to oxygen, high temperatures, and light can similarly degrade samples and should preferably be avoided. The integrity of the mass spectrometry surface and printed samples may be preserved by utilizing the packaging methods and modalities disclosed herein to minimize these types of environmental exposures.

In an embodiment as illustrated in FIG. 1, a stability-packaged MS array includes a barrier 105 isolating the MS samples from physical contact. The barrier may be of any composition, dimensions, or geometry and disposed in any manner or position operable to protect the MS samples from physical contact, such as, for example, physical contact with the barrier itself, physical contact with the enclosure, and/or physical contact with any other object that might disturb or contaminate the MS sample or MS substrate. In some embodiments a barrier is disposed and configured to cover the MS samples and establish a space or gap 107 between the MS samples and the barrier. It will be apparent to persons of skill in the art that many arrangements and configurations are possible interposing one or more barriers covering, surrounding, and/or disposed adjacent to one or more MS samples. In some embodiments, the barrier may be integral with the enclosure. In some embodiments as illustrated schematically in FIG. 1, the barrier may comprise or be part of a container within which the MS array is disposed and the container may be disposed within the enclosure 102. In some embodiments the barrier may be rigid or semi-rigid, and/or held in position and/or displaced from the MS samples by a rigid or semi-rigid support. In some embodiments as illustrated in FIG. 1, the MS substrate with MS samples arrayed thereon may be disposed within a container wherein the MS substrate and or frame or mounting structure on which the MS substrate is mounted are constrained in position by one or more positioning members 120, or in any other manner operable to position the MS samples relative to the barrier, thereby establishing a gap or space between the MS samples and/or MS substrate surface and a barrier 105 disposed adjacent to and/or covering the MS samples and/or MS substrate. In some embodiments, an MS substrate with MS samples arrayed thereon may be disposed in a container such as, for example, a standard semiconductor wafer carrier or equivalent, which may optionally be modified as appropriate to accommodate the dimensions and geometry of the MS substrate and/or frame or mounting structure in which the MS substrate is mounted, and to ensure the maintenance of a gap or space adjacent to the MS samples. In some embodiments, the semiconductor wafer carrier or equivalent may be disposed within the enclosure 102.

In some embodiments, a light shield is provided to protect the MS samples and/or MS substrate surface from exposure to light. A light shield may be of any composition, dimensions, and geometry and disposed in any position or manner operable to block or reduce the exposure of the MS samples and/or MS substrate surface to all or part of the spectrum of visible, infrared, and/or ultraviolet light. Whether a light shield should be included in an embodiment, and if so the optical and other properties of the light shield may be determined based upon the MS samples and substrate composition to be protected, and their sensitivity to deterioration and/or alteration by the various wavelengths of light to which the stability-packaged MS array may be exposed. However, keeping in mind that an object of the disclosure hereof is to facilitate arraying and MS analysis of large numbers of distinct samples having undetermined optical properties that may vary widely over the samples being arrayed, it will usually be found preferable to shield the MS arrays completely from light. In some embodiments, the enclosure, the barrier against physical contact, or another component of the package MS array may be composed of or include an opaque or non-light transmitting material or coating or otherwise integrate a light shield.

In some embodiments, an environmental control system 125 is provided. An environmental control system may be or include any substance, material, device, or component operable for conditioning and/or modifying the atmosphere and/or environment within the enclosure 102, and in particular the atmosphere and/or environment immediately proximate to the MS samples and/or MS substrate surface, in a desired manner. In some embodiments, an environmental control system may include a dehumidifying component such as, for example, a desiccant. Avoidance of moisture during transport and storage is particularly important as rapid changes in temperature/humidity (i.e. during airline cargo transport, or on removal from cold-storage) can cause rehydration of the array spots due to absorption of moisture from the air by the array spots or in cases where the sample is shipped at reduced temperatures for enhanced stability for example on dry or wet ice. Rehydration can increase the rate of sample degradation, cause neighboring array spots to combine/cross-talk, or generate sample spot inhomogeneity during repeated spot rehydration/drying that increases mass spectrometry readout variability. In some embodiments an environmental control system may include a temperature controller disposed and configured to maintain the temperature to which MS samples are exposed within predetermined limits. For example, the MS array and enclosure and protective barrier may be further enclosed in a temperature controlled box or package. In some embodiments an environmental control system may include one or more filters or other purifiers, which may be active or passive, operable to purify and/or remove or sequester contaminants such as, for example, particulates, moisture, and/or volatilized solvents or other undesired substances.

Care should preferably be taken to avoid contamination of the MS samples and/or MS substrate surface by particulates or other contaminants that may be emitted by any component of the apparatus, such as, for example, by an environmental control system or a component thereof such as, for example, a desiccant. In some embodiments, an environment control system includes a desiccant composed of a contaminant suppressant composition and/or packaged in a contaminant suppressant package. In some embodiments, a filter is provided and disposed to protect the MS samples and/or MS substrate surface from particulates, while allowing passage of gases and vapors. In some embodiments, the MS substrate and MS samples are enclosed in a partially sealed or selectively permeable container and a desiccant or other potentially contaminant-emitting component is disposed outside the container, thereby allowing diffusion of gases or vapors from the container but inhibiting the migration of particulates or contaminants into the container by substantially restricting the available paths and eliminating straight line paths by which particulates might enter the container. In some embodiments, wherein the container is a semiconductor wafer carrier or equivalent, and the environmental control system is or includes a packaged desiccant, the container may be partially closed and the packaged desiccant may be taped or otherwise disposed against a surface of the container.

In some embodiments, a stability-packaged MS array is de-packaged by removing the MS substrate with MS samples applied thereto from the enclosure, protective barrier, environment conditioning system, and/or other packaging, and MS analysis is performed. In various embodiments, MS analysis and/or MS measurements may be performed by any MS technique operable to provide a measure of one or more MS characteristics of interest. In some embodiments, the results of an MS measurement and/or MS analysis may include a mass spectrum and/or any part thereof or characteristic or quantity derivable therefrom, such as, for example, a plot or vector of peak intensities at one or more m/z values of interest, or a table of ions and their corresponding intensities. In various embodiments, a MS characteristic measured and/or reported may include any characteristic or property of an MS sample capable of being measured or estimated by one or more MS techniques, such as, for example, a peak height or intensity at a specified m/z; the presence, absence, and/or abundance of a specified analyte or moiety in a MS sample; or the degree to which a sample matches a pattern or standard.

The methods, apparatus, compositions, and articles of manufacture disclosed herein will be found useful in connection with offsite MS analysis by any MS analysis method or modality and using any MS instrument(s) operable for determining an MS characteristic of an MS sample applied to an MS array, such as for example, time-of-flight, magnetic sector, quadrupole, ion trap, ion cyclotron resonance, orbitrap, ion mobility spectroscopy, electrostatic sector analyzers, or hybrids of any of these mass analyzers.

In some embodiments, spatially defined desorption and/or ionization approaches are used to generate ions from the MS array such that the composition of array element(s) can be linked to the position of the array element(s). Commonly this may be accomplished by scanning and/or targeting a focused beam over the surface to desorb molecules and/or ions from a defined region of the surface. However, while not common in the art, it is also possible to desorb molecules/ions from larger (x-y) regions and maintain the relative x-y positions and then detect the ions using a spatially defined detector. Here the mass may be determined using a mass analyzer, for example time-of-flight, and the position may be determined based on the detector element. There are a wide range of technical approaches for generating ions in a spatially defined manner. Many approaches simultaneously desorb and ionize the molecules. Approaches using focused beams for spatially defined mass spectrometry include: secondary ion mass spectrometry (SIMS), which utilizes an ion beam to desorb and ionize molecules; MALDI, which utilizes a laser beam; desorption electrospray ionization (DESI), which utilizes a focused electrospray beam; and nanoDESI, which uses a small pool of solvent to determine the locus from which sample is ionized. In some embodiments methods may be used in which the desorption and ionization processes are decoupled, such as, for example, laser ablation electrospray ionization (LAESI) where an IR laser is used for desorption followed by electrospray ionization, and liquid extraction surface analysis (LESA), where the samples are extracted from a surface and then analyzed from the liquid phase typically using electrospray ionization. In some embodiments, methods may be used wherein ions can be generated on the surface first (e.g. by adding acidic buffer) and then desorbed using a spatially defined desorption technique.

In some embodiments, MS analysis is performed by laser desorption/ionization (LDI) MS, wherein laser energy from, for example, an ultraviolet laser or an infrared laser, is applied to desorb analytes from a surface and volatilize and ionize them making them available to the ion optics, mass analysis, and/or detection components of a mass spectrometer. In some embodiments MS analysis is performed by matrix assisted laser desorption/ionization (MALDI), wherein a matrix is employed to absorb energy from the laser and facilitate desorption/ionization. In various embodiments a matrix may be or include any material or composition operable to absorb laser energy and/or contribute to ionization and/or desorption of analyte, such as, for example, nanoparticles or colloids (e.g. gold nanoparticles), and/or organic matrix molecules e.g. alpha-cyano-4-hydroxycinnamic acid, dihydroxy benzoic acid (DHB), and/or sinapinic acid, which may be applied to, for example, indium tin oxide glass slides or steel/gold targets. In some embodiments MS analysis is performed by surface enhanced laser desorption/ionization (SELDI), wherein analyte molecules are captured or bound, by for example affinity capture or covalent binding, onto a MS substrate surface. In various embodiments of LDI, matrix may be applied in any manner operable to produce a desired matrix-analyte composition on an MS substrate, such as, for example, by applying matrix to an MS substrate surface prior to application of MS sample; applying a mixture of matrix and sample; applying matrix and sample simultaneously or sequentially in any order and allowing them to mix on the substrate, such as by sequential acoustic deposition of matrix and sample onto the same substrate locus; or applying matrix after application of the MS sample to the substrate and allowing the matrix and sample to co-crystallize onto the substrate. In some embodiments, any other type of LDI MS operable for a desired analysis may be employed to perform MS analysis on an MS array, such as, for example, surface enhanced neat desorption (SEND), or surface enhanced photolabile attachment and release (SEPAR). The presence of matrix potentially poses additional stability concerns and underscores the usefulness of stability-packaging according to the methods and apparatus disclosed herein where offsite analysis is contemplated.

In some embodiments, particularly where signals of interest lie in a range below about 700 Da m/z where background signals from matrix entities may be problematic, matrix-free LDI techniques may be employed; these may include any matrix-free technique operable for MS analysis of a MS sample or analyte of interest, such as, for example, use of substrates including light-absorptive materials such as nanoporous silicon, silicon nanowires, gold nanoparticles, or other energy-absorbing materials; nanoparticle-assisted LDI MS (nano-PALDI MS); sol-gel assisted LDI (SGALDI); and matrix free material-enhanced LDI (MELDI). In some embodiments, light can be used to desorb the sample as in, for example, laser ablation electrospray ionization (LAESI), or the sample array may be scanned using direct analysis in real time (DART) techniques or DESI. In some embodiments combinations of the described approaches may be employed, such as, for example, NIMS followed by photoionization to improve ion yields. Many variations, embodiments, and combinations of techniques for MS generally and LDI MS in particular exist, and are operable for use with MS substrates and MS arrays of many types and compositions, and the methods, apparatus, compositions, and articles of manufacture disclosed herein may usefully be employed to apply MS samples to such substrates and/or stability-package MS arrays for offsite analysis by any of such methods.

The methods disclosed herein will be found particularly useful in embodiments wherein factors or conditions are present suggesting a need for precautions to ensure the integrity of the MS samples and MS array during handling and transport, such as, for example, where MS samples, MS substrates, coatings, or matrix include compositions that are particularly susceptible to absorption of moisture, volatilization, or contamination; where MS samples are applied at a spot spacing or on a surface posing greater risk of cross-contamination between samples due to inadvertent solvation or other factors; or where the association of the MS samples with the MS substrate is relatively weak. Thus, for example, the methods disclosed herein will be found particularly useful in connection with non-capture application techniques, wherein MS samples are not captured on the MS substrate, such as by covalently binding to the MS substrate, capture via strong affinity tags, and/or other modalities that substantially immobilize or stabilize MS samples on the MS substrate.

In some embodiments one or more quality control tests or measurements are performed. A quality control test or measurement may comprise any test, measurement, or observation for verifying that an operation or step as disclosed herein succeeded within specified bounds and/or produced a result conforming to a standard or tolerance of interest. Quality control checks can be usefully employed with respect to any operation and at any stage of the methods disclosed herein. In particular, it may be found useful, for example, to verify during or after the application stage that MS samples are applied in volumes, at loci, and/or having morphology as intended; to verify that an MS array has been stability packaged correctly and that all components of the stability package are present, correctly disposed, and functional; that a MS array remains stable and uncontaminated following packaging and transport; and/or that measured MS characteristics conform to expected ranges or standards. In some embodiments, quality control includes inspecting an MS array after application of MS samples thereto, which may include observing or measuring any quality control property of interest, such as, for example, the area occupied by an MS sample, the morphology of an applied MS sample, the light reflective or absorptive properties of an applied MS sample, the fluorescence properties of an applied MS sample, the spot-to-spot variability of any property, or the uniformity of any property over the MS array, from spot to spot, or within a spot. In some embodiments quality control testing may include visual inspection and/or spectroscopic analysis of the MS array. In some embodiments it will be found useful to include on an MS array one or more MS samples comprising quality control standards, upon which MS measurements may be made so as to verify the continued stability and contaminant-free state of the MS array at the time of MS analysis. Such standards may comprise any composition operable for MS analysis thereon and having an MS characteristic capable of measurement; in some embodiments it will be found useful to employ standards having composition similar to MS samples and/or potentially susceptible to detectable alteration in the presence of particular possible confounding factors. Thus, for example, in an embodiment where cross-contamination between MS samples due to moisture absorbance is a concern, a pair of closely adjacent MS samples could be employed comprising compositions having distinguishable MS characteristics and known to be susceptible to moisture absorbance and instability therefrom, so that intermixing could be detected on MS analysis. One or more quality control standards may be employed to verify the integrity of the stability packaging, such as, for example an indicator that produces a detectable signal in the presence of moisture or a contaminant. Standards and/or quality control checks may also be usefully employed as appropriate to the MS analysis method used, as will be familiar to persons of skill in the art.

In some embodiments, methods and/or apparatus are provided for recording, maintaining, transmitting, and/or providing access to tracking information and MS analysis results. Useful aspects may include one or more of: assignment of tracking identifiers to MS samples; recording of descriptors of positions at which MS samples are present on an MS array; recording the tracking identifiers of MS samples corresponding to position descriptors; communicating tracking and/or position descriptor information to a MS analysis provider; employing position descriptor information in performing MS analysis and targeting particular samples; associating MS results with particular samples and/or their position descriptor information and/or their tracking numbers; and/or communicating MS results with associated tracking information to a customer or person entitled thereto, in bulk, in response to a query including the tracking information, or otherwise. Information may be recorded, processed, updated, queried, and communicated in any manner and using any modalities operable for information processing, Information may be recorded on paper, on portable electronic media such as a magnetic disk, optical disk, memory card, USB memory device, or in the memory of a computer, or in any other modality operable to store data. Information may usefully be organized in records and/or in a data structure that facilitates efficient searching, updating, querying, or other operations of interest, such as, for example, a relational database, an object-oriented database, an XML or other structured record, or a table-based database or data structure.

A data management system can be used to link index locations of the samples on the MS substrate to resulting spectral data. This can be achieved by generating a file containing the positions of the samples and their relative position and mapping this information to the spectra data based on the relative position. In an embodiment the index file is generated for the sample deposition and is transferred to a computer system and upon analysis of the printed samples at a remote location, the resulting spectral data files are then correlated with the original index system such that individuals can use the spectra data to obtain compositional information on one or more indexed sample.

In an embodiment, information including tracking information such as tracking identifiers and MS analysis results pertaining to the corresponding MS samples may be communicated to a customer or other person entitled thereto by any method and/or modality operable to transmit the desired information, including, for example, providing a written report; providing data on non-transitory computer readable media; and/or providing access to a data management system operable to respond to a query including tracking information by outputting the MS analysis results pertaining to the corresponding MS samples. In an embodiment a customer may record tracking identifiers corresponding to each MS sample in its own data system at the time of providing the samples for applying to MS arrays, and MS analysis results are provided on non-transitory computer readable media in a structure and format compatible with a customer's data system, or in a standard structure and format such as XML, so that the customer may readily incorporate the MS analysis results in its own data system.

Figure 14:
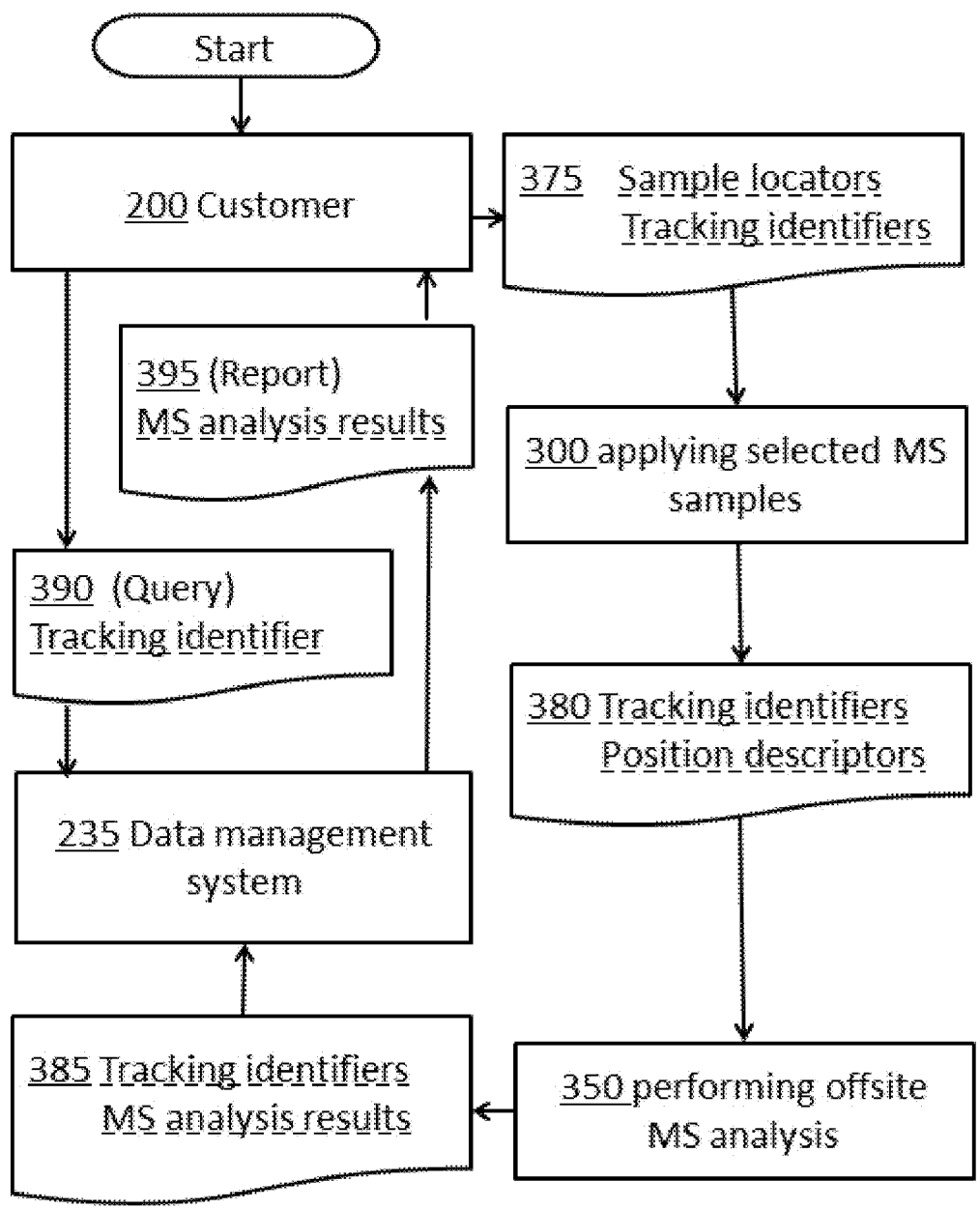
FIG. 14 depicts an embodiment of a data management system consistent with the disclosure hereof.

In an exemplary embodiment of a data management system as illustrated in FIG. 14, a customer 200 selects library samples desired to be analyzed and provides a record 375 including, for each sample, a tracking identifier and a sample locator, which may be any information by which the specified sample may be located and obtained for purposes of extracting an MS sample therefrom, such as, for example, an identifier for accessing a specific sample in a sample management system, or a well plate number and row/column. In an embodiment, the sample locator may be employed as a tracking identifier. The customer maintains records associating each tracking identifier with the corresponding library sample. MS samples are extracted from the library samples and applied 300 to an MS substrate. A record 380 is created including, for each MS sample, the corresponding tracking identifier and a position descriptor indicating the position of the MS sample on the MS substrate. The information of the record 380 is used to control a MS instrument to select a specified MS sample for analysis. In an embodiment, the record 380 may be included in a non-transitory machine readable file that can be employed directly or used to generate another file compatible with the MS instrument. In an embodiment, the record 375 and/or the record 380 may be stored in a data management system 235 where they may be accessed by the customer, an MS analysis provider, or another person entitled thereto. From performing offsite MS analysis 350, MS analysis results for an MS sample are associated with the tracking identifier corresponding to the MS sample in a record 385, which is added to a data management system 235. The customer may then submit a query 390 including the tracking identifier corresponding to a sample of interest to the data management system and retrieve therefrom a record 395 including MS analysis results for the MS sample to which the queried tracking identifier corresponds. In an embodiment, a data management system may be implemented in any manner and using any apparatus operable to carry out the desired operations, such as, for example, by a computer running database software to which records are added and from which desired information may be queried. In an embodiment, user interfaces may be provided for entering records and/or queries and/or for displaying information. In an embodiment, access is provided whereby a customer, MS analysis provider, or other authorized person may access the data management system remotely over a network, such as, for example, a local area network, or the internet.

MS samples and MS substrates may be prepared, handled, manipulated, combined, transformed, analyzed, and/or processed according to any of the many methods, techniques, best practices, guidelines, and heuristics and using any of the devices, components, apparatus, or structures disclosed herein or known to persons of skill in the art. The data management methods disclosed herein may be implemented using any operable methods and devices, in software or hardware, using single processor systems and/or multiprocessor and/or distributed systems, allocating tasks among components, software or hardware modules, and process steps in any manner, and performing tasks in any order, operable to carry out the disclosed tasks.

Also disclosed herein is a method of stability-packaging a MS substrate having a plurality of MS samples applied thereto, the method including enclosing the MS samples in an enclosure, which may be a sealed enclosure; establishing a contaminant-protective environment proximate to and/or surrounding the MS samples; and protecting the MS samples from physical contact. In some embodiments establishing a contaminant-protective environment may include any measures and/or employment of any materials and/or components operable to block, filter, remove, or otherwise restrict or prevent the presence of one or more contaminating substances in the environment proximate to the MS samples. Contaminating substances may include any substances capable of altering or affecting an MS sample in a manner posing a risk of introducing inaccuracies into a MS measurement. The particular contaminating substances to be protected against, and the degree of protection required, may depend upon factors such as the composition of the MS samples, the MS substrate and any coatings or matrix present, the temperature, pressure, humidity, vibration, and other conditions to which the stability-packaged MS samples may be subjected, and any other factors affecting the susceptibility of particular MS samples to alteration or contamination. In some embodiments, contaminating substances of potential concern include moisture and/or particulates. In some embodiments establishing a contaminant-protective environment includes establishing a substantially dehumidified, particulate-free environment.

The MS samples may be enclosed in an enclosure as disclosed herein or in any other manner operable to establish or define a region proximate to and/or surrounding the MS samples wherein a substantially dehumidified, particulate-free environment may be established. In an embodiment, the MS samples may be enclosed in a Mylar bag or sleeve and the opening(s) in the bag or sleeve may be closed by heat sealing, sonic welding, use of an adhesive, clamping, or any other method for operable for establishing and maintaining a seal.

In some embodiments a sealed enclosure may be provided and sealed according to any method and/or using any materials and/or components operable to provide a sealed compartment proximate to and/or surrounding the MS samples.

Establishing a contaminant-protective environment proximate to and/or surrounding the MS samples may include fully or partially evacuating an enclosure within which the MS samples are enclosed; charging an enclosure within which the MS samples are enclosed with a substantially moisture-free, particulate-free gas or fluid, which may be an inert or non-interactive gas or fluid as disclosed herein; and/or dehumidifying and/or filtering or removing particulates from a gas or fluid proximate to the MS samples. In some embodiments, a method of packaging a MS substrate having a plurality of MS samples applied thereto may include disposing a desiccant or other conditioner in diffusive communication with a gas or fluid proximate to or surrounding the MS samples.

Protecting the MS samples from physical contact may include disposing a physical barrier covering and/or proximate to the MS samples as disclosed herein, or may be accomplished in any other manner operable to protect the MS samples against contact with a foreign object.

Also disclosed herein is a method of packaging, according to the disclosure hereof, an MS substrate having a plurality of MS samples applied thereto, and dispatching the stability-packaged MS array for off-site transport. In an embodiment, dispatching a stability-packaged MS array for off-site transport may include directing, arranging for, contracting for, giving instructions for, or otherwise causing transport of the stability-packaged MS array to a second location removed from a location at which the MS array was packaged. In an embodiment, dispatching a stability-packaged MS array for off-site transport may include, for example, depositing the stability-packaged MS array in the mail; sending a stability-packaged MS array by messenger, or by a freight forwarder, package express service, or other common carrier; or hand carrying a stability-packaged MS array.

Also disclosed herein is a method including packaging, according to the disclosure hereof, an MS substrate having a plurality of MS samples applied thereto, and receiving information comprising a MS characteristic, determined by MS analysis performed at an off-site location on at least one of the MS samples.

Also disclosed herein is a method of doing business including receiving a stability-packaged MS array from a customer, performing MS analysis on an MS sample present on the MS array, and communicating to the customer the results of the analysis. In an embodiment, the method includes performing MS analysis on an MS sample to which analysis is targeted using a position descriptor associated with a tracking identifier, and communicating the results of the analysis to the customer in association with the tracking identifier, and information regarding the identity, composition, and provenance of the analyte(s) present in the MS sample is not provided by the customer. In an embodiment, the method may also include any or all of applying the MS sample to the MS substrate, stability-packaging the MS array, dispatching the stability-packaged MS array for offsite transport, and/or transporting the stability-packaged MS array.

Example 1

Figure 7:
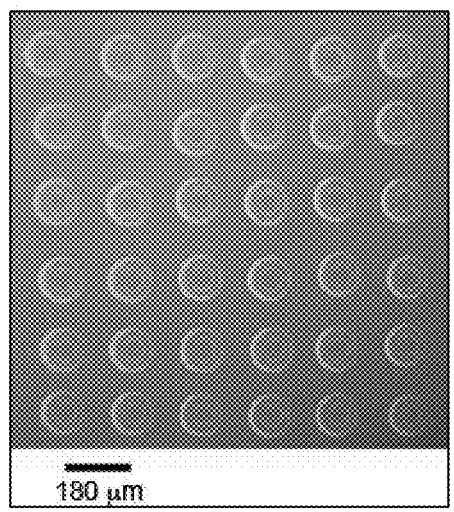
FIG. 7 shows an optical microscopic image of an embodiment of an acoustically printed MS array.

The miniaturization of library samples was accomplished by acoustically applying 1 nL droplets from cellulose assay samples stored in multi-well microtiter plates to a MS substrate. FIG. 7 is an optical microscopic image of a portion of the resulting acoustically printed array. Here samples that were 1 mm apart in 3 mm high wells are transformed into an MS array that is 0.18 mm apart and 0.5 mm high (the thickness of the MS substrate), a more than 30-fold densification.

Example 2

An alpha-amylase enzyme was incubated with two starch sources, potato amylose and corn amylopectin diluted in 20 mM sodium acetate buffer in a standard 96-well microtiter plate. The enzyme reaction was run for 90 minutes at 95 C in an incubator. After 90 minutes, the enzyme reaction was quenched with methanol 1:1 (vol:vol).

6 µL of quenched reaction mixture was transferred from the 96-well plate to a 1536-well film-bottom microtiter plate. The 1536-well plate was mounted to the source stage of an EDC ATS-100 acoustic liquid transfer system. A silicon mass spectrometry chip was mounted to a SBS format carrier frame, compatible with a Bruker laser desorption/ionization mass spectrometer, and containing fiducial marks for alignment, then mounted active-side down in the target stage of the EDC ATS-100 such that the active side of the mass spectrometry chip was 2 mm above the 1536-well source plate on the source stage. A plurality of samples was printed acoustically from the source plate onto the mass spectrometry chip as a rectangular array of 20 nL drops with a center-to-center spot pitch of 400 microns and all positions relative to the fiducial marks.

The printed mass spectrometry chip attached to the SBS carrier frame was covered with a plastic protective cover to prevent physical damage. A non-leaching, dust-free desiccant cartridge was attached to the bottom of the carrier frame with an attachment clip on the back of the carrier. A Mylar sleeve was placed over the entire apparatus and heat sealed at one end. The open end of the Mylar sleeve was placed in a vacuum sealer to evacuate the interior of the Mylar sleeve, then heat sealed. The entire apparatus was then placed in an envelope and shipped from San Diego, Calif. to Fremont, Calif. via air cargo.

Figure 8:
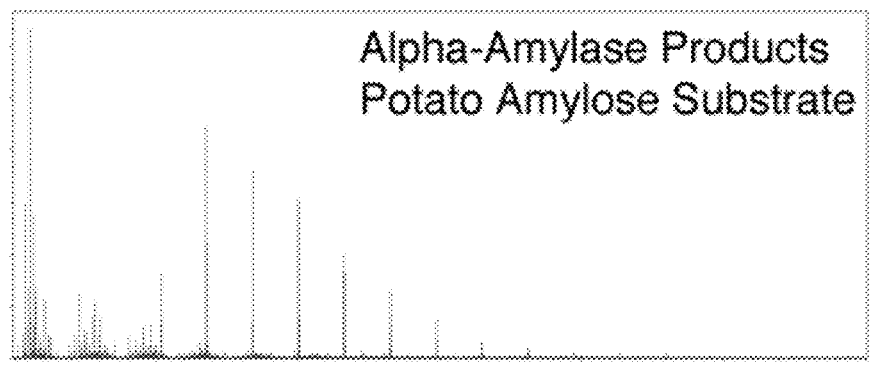
FIG. 8 shows an enzyme assay mass spectrum acquired from a trackable position on an embodiment of an MS array following stability-packaging and transport consistent with the disclosure hereof.

Mass spectrometry data acquisition was performed at the remote analysis facility. The SBS carrier frame containing the printed sample array mass spectrometry chip was removed from the Mylar sleeve and desiccant cartridge removed from the attachment clip and it was found that the shipping container had preserved the physical integrity of the array during transport. Analysis of the chemical composition at the remote facility was performed using a Bruker laser desorption/ionization mass spectrometer. The fiducial marks enabled registration of the sample. The first position of the sample array was taught to the mass spectrometer target stage relative to the same fiducial marks used for acoustic sample deposition, enabling data acquisition to be performed on a per-spot basis where each mass spectrum contained a row/col ID in the data file header. The position of each acquired mass spectrum was recorded and correlated to the sample ID at each specific location. Data was made available in digital format for facile remote access by the customer via the internet. FIG. 8 shows an enzyme assay mass spectrum acquired from a specific position on the spatially encoded amylase enzyme array after storage/transport.

Example 3

96 urine samples, some of which contain illicit drug metabolites, were mixed 1:1 (vol:vol) with acetonitrile containing 0.1% trifluoroacetic acid in a 96-well plate with each extraction mixture in a separate well.

6 µL of the extraction mixture was transferred to a 1536-well film-bottom microtiter plate. The 1536-well plate was mounted to the source stage of an EDC ATS-100 acoustic liquid transfer system. A silicon mass spectrometry chip was mounted to a SBS format carrier frame compatible with a Bruker laser desorption/ionization mass spectrometer containing fiducial marks for alignment, then mounted active-side down in the target stage of the EDC ATS-100 such that the active side of the mass spectrometry chip was 2 mm above the 1536-well source plate on the source stage. 96 samples were printed acoustically from the source plate onto the mass spectrometry chip as a rectangular array of 10 nL drops with a center-to-center spot pitch of 400 microns and all positions recorded relative to the fiducial marks.

The printed mass spectrometry chip was packaged as described in Example 2 and stored for four days at −20 C before analysis. The entire apparatus was then placed in an envelope and shipped from San Diego, Calif. to Fremont, Calif. via ground transportation.

The SBS carrier frame containing the printed sample array mass spectrometry chip was removed from the Mylar sleeve and desiccant cartridge removed from the attachment clip. The entire frame was inserted into a Bruker laser desorption/ionization mass spectrometer. The first position of the sample array was taught to the mass spectrometer target stage relative to the same fiducial marks used for acoustic sample deposition. Data acquisition was performed on a per-spot basis where each mass spectrum contained a row/col ID in the data file header. Data was delivered to the customer via a portable USB memory stick.

Figure 9:
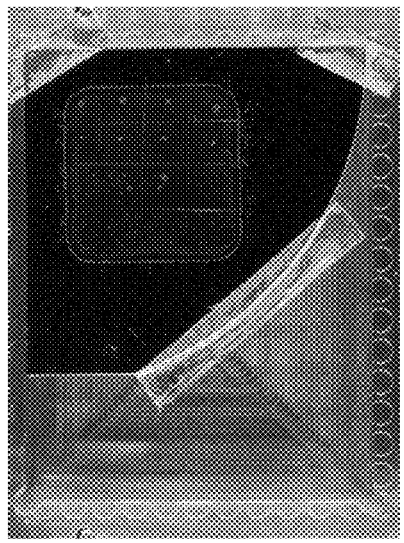
FIG. 9 shows a MS array having a urine sample applied at a trackable locus consistent with the disclosure hereof.

FIG. 9 shows a spatially encoded transportable urine sample analysis with mass spectrometry.

Figure 10:
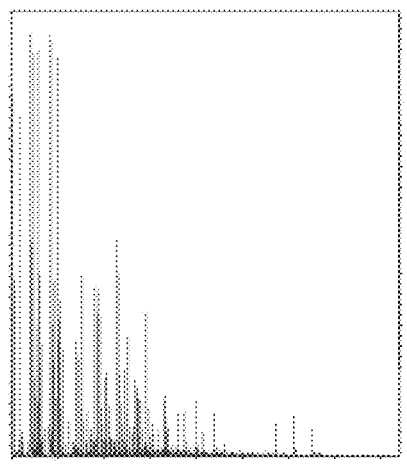
FIG. 10 shows a mass spectrum obtained from a urine sample applied to a trackable locus on an MS array following stability-packaging and transport consistent with the disclosure hereof.

FIG. 10 shows a mass spectrum obtained from a specific urine sample on the spatially encoded array after storage/shipping.

Example 4

Human liver microsomes (HLMs) expressing the CYP2D6 enzyme were incubated with 10 µM dextromethorphan for 7 minutes at 37 C in 25 mM potassium phosphate buffer containing 1 mM NADPH, 2 mM MgCl and 700 nM of isotope labeled dextrorphan internal standard used for calibration and quantitation. After 7 minutes, the reaction was quenched with acetonitrile 3:1 (vol:vol).

Figure 11:
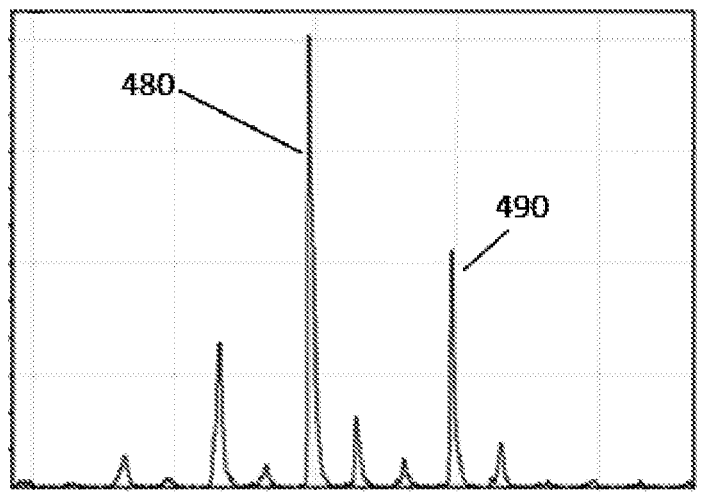
FIG. 11 shows a mass spectrum obtained from a drug toxicity assay sample applied to a trackable locus on an MS array following stability-packaging and transport consistent with the disclosure hereof.

6 µL of the quenched reaction mixture was transferred to a 1536-well film-bottom microtiter plate and centrifuged for 5 minutes at 200×g. The 1536-well plate was mounted to the source stage of an EDC ATS-100 acoustic liquid transfer system. A Bis-F17 coated NIMS mass spectrometry chip was mounted to a SBS format carrier frame compatible with a Bruker laser desorption/ionization mass spectrometer containing fiducial marks for alignment, then mounted active-side down in the target stage of the EDC ATS-100 such that the active side of the mass spectrometry chip was 2 mm above the 1536-well source plate on the source stage. 96 samples were printed acoustically from the source plate onto the mass spectrometry chip as a rectangular array of 15 nL drops with a center-to-center spot pitch of 400 microns and all positions relative to the fiducial marks. In this manner the sample was printed as a miniaturized spatially encoded sample array on a mass spectrometry surface after which it was stability-packaged as described in Example 2 and stored for two weeks at −20C before analysis. The stability-packaged sample arrays were placed in an envelope and shipped via air from San Diego, Calif. to Hartford, Conn. for mass spectrometry data acquisition. Mass spectrometry data acquisition was performed such that the location of each acquired mass spectrum was recorded and correlated with sample ID on the spatially encoded sample array. Data was delivered to the customer remotely via the internet. FIG. 11 shows a mass spectrum obtained from a specific drug toxicity assay sample on the spatially encoded array after storage/shipping, showing the correct exact mass peak 480 for this compound and the internal standard, 2H3-dextrorphan 490.

Example 5

Figure 12:
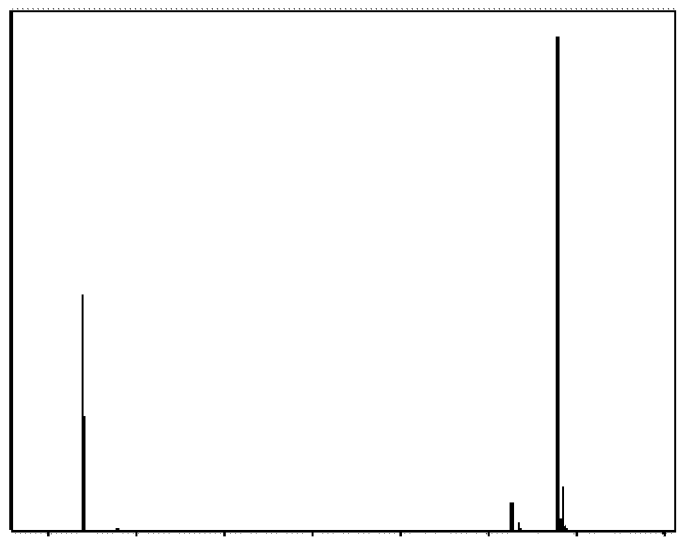
FIG. 12 shows a mass spectrum obtained from a drug molecule sample applied to a trackable locus on an MS array following stability-packaging and transport consistent with the disclosure hereof.

A 1536-well plate of drug candidate molecules dissolved in DMSO and diluted to 40 µM concentration was printed using an EDC ATS-100 acoustic transfer system onto a mass spectrometry surface as a spatially encoded array according to the method described in Example 2. 96 samples were printed acoustically from the source plate onto the mass spectrometry chip as a rectangular array of 2 nL drops with a center-to-center spot pitch of 400 microns and all positions relative to the fiducial marks. The mass spectrometry surface stability-packaged as described in Example 2 and preserved for 3 days. The stability-packaged array was shipped from San Diego, Calif. to Fremont, Calif. by air cargo for mass spectrum data acquisition. The SBS carrier frame containing the printed sample array mass spectrometry chip was removed from the Mylar sleeve and desiccant cartridge removed from the attachment clip. The entire frame was inserted into a Bruker laser desorption/ionization mass spectrometer. The first position of the sample array was taught to the mass spectrometer target stage relative to the same fiducial marks used for acoustic sample deposition. Tandem mass spectrometry data acquisition was performed on a per-spot basis where each mass spectrum contained a row/col ID in the data file header. Parent and tandem mass spectra were acquired from each sample such that the spatial location of the parent and tandem mass spectrum were recorded and correlated back to a specific sample ID. Data was delivered to the customer remotely via the internet. FIG. 12 shows a tandem mass spectrum obtained from a specific drug molecule sample on the spatially encoded array after storage/shipping.

Example 6

Integration of acoustic printing and MS analysis registration systems at the time of printing. Here sample registration on an MS array was maintained between the point of printing and the point of mass spectrometry readout so as to facilitate tracking of MS sample positions, with three or more fiducial markers being used for alignment. MS substrates were mounted in a machined steel frame designed to hold up to two chips. The frame has SBS dimensions for robotic handling compatibility. Fiducial points were positioned at each of the four corners of the frame, and each chip mounting position has an indexed corner that the upper left corner of the mass spectrometry chip is placed tightly against. The four fiducial points on the frame are used as spatial reference points for acoustic array printing on the mass spectrometry chips mounted to the frame. For mass spectrometry readout, the frame is mounted to a target plate compatible with the particular mass spectrometer being used. The same four fiducial points on the frame are then used to program the X-Y axis of the mass spectrometer so that the X-Y origin matches that used during acoustic printing using an EDC ATS-100. At the time of printing a GAL (Genepix Array List) file is generated, which is not a standard output for acoustic transfer systems but was adapted for use. A MS plate map was computed from the GAL file and written to a file in a format compatible with the mass spectrometer stage software. This plate map file defined the center of each array spot relative to the X-Y axis origin, and may include the diameter of each spot. By calibrating the mass spectrometer stage to the same X-Y axis origin as was used during printing, and subsequently defining each array spot center relative to that same X-Y axis origin, spot registration was maintained throughout printing, transport, storage, and acquisition. The tracking identifier of each spot was also stored in the GAL file at the time of printing, and also recorded in the generated MS plate map file. As a result, the desired outcome was achieved: each sample spot spectrum was found to contain the 1) location (x, y coordinate) on the array and 2) the unique sample ID, and 3) the raw mass spectrum contained within the spot spectrum metadata file generated by the MS instrument at the time of acquisition.

Example 7

Samples are applied by acoustic printing to a sample-accepting surface of an MS substrate. Because acoustic printing is affected by changes in the speed of sound through the sample media, an initial calibration step was performed when printing a new sample composition. (This calibration can be utilized during future acoustic printing of the same/similar sample composition.) The calibration process was performed by starting with low acoustic emission energy and increasing that energy step-wise to high acoustic emission energy. At each emission energy, the ejected droplet volume was calculated by emitting an echo wave that does not eject a droplet but instead reflects off of the sample meniscus. From the time between echo wave emission and reflection (the acoustic transducer also acts as a receiver), given the sample reservoir/well geometry, the ejected droplet volume was calculated. Finally the calibration curve is generated by plotting the acoustic wave emission energy vs. the ejected droplet volume.

Once the calibration curve for a specific sample composition has been generated, the curve is then used to acoustically eject a specific volume of 1 nL of sample onto the mass spectrometry chip to produce a high-density array consisting of nanoliters/picoliters of a plurality of samples. A sample source plate, typically a 96, 384, or 1536-well film-bottom microtiter plate, was mounted to the source stage of an EDC ATS-100 acoustic liquid transfer system with the top (open side of wells) of the plate facing up. The mass spectrometry chip is mounted to an SBS format carrier frame, and the mounted chip is then mounted in the target stage of the EDC ATS-100 above the sample source plate such that the active surface of the chip was facing down towards the top of the source plate, with the active surface approximately 2 mm above the source plate. This second stage to which the mass spectrometry chip is mounted moves independent from the sample source plate stage. The acoustic printer was then programmed to position a specific source well over the acoustic horn, and in parallel the chip stage positions the mass spectrometry chip over the selected source well such that the desired array spot placement position was centered over the opening of the source well. Then the acoustic horn was programmed to emit an acoustic pulse to eject a droplet of typically 1 nanoliter from the source well onto the mass spectrometry chip. If more material was required on the array spot, additional droplets are ejected without moving the source plate or the mass spectrometry chip (replicate-on-drop printing). Additionally, other samples/reagents could have been printed from a different source well to the same array spot to perform chemistry, add internal standards, or enhance detection.

This process was repeated for a plurality of samples to produce a high-density array of many samples on a mass spectrometry chip resulting in array densities of 100-800 micron center-to-center spot pitch.

Example 8

Figure 15A:
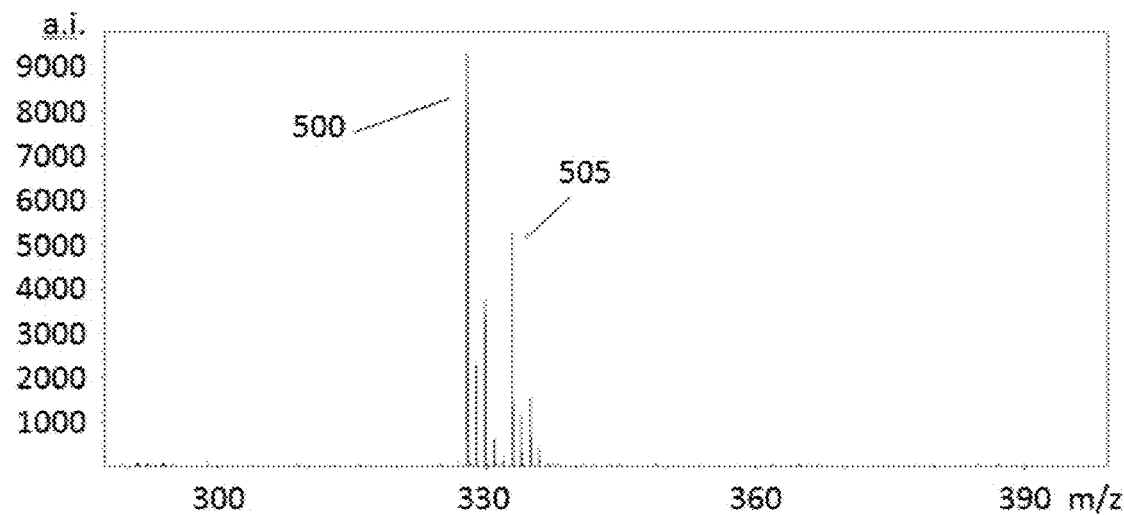
FIG. 15A shows a mass spectrum of N-Desethylamodiaquine obtained prior to stability packaging and offsite shipping.
Figure 15B:
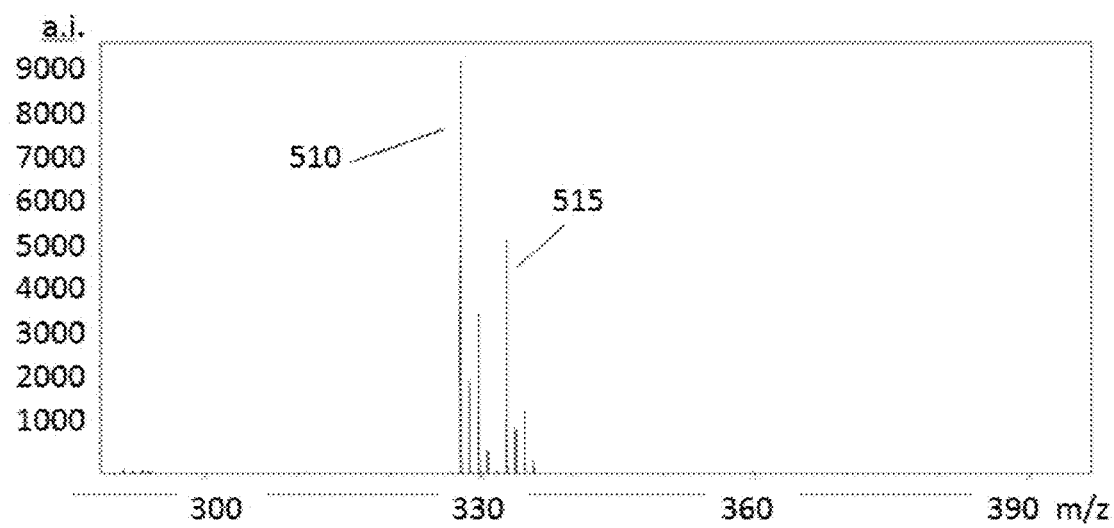
FIG. 15B shows a mass spectrum of N-Desethylamodiaquine obtained after stability packaging and offsite shipping.

N-Desethylamodiaquine was diluted to 1 mM in 20 mM potassium phosphate buffer with 700 nM D(5)-N-desethylamodiaquine internal standard, then mixed 1:1 (vol:vol) with a solution of 97% water 3% acetonitrile and 0.1% trifluoroacetic acid. The resulting mixture was transferred to a 1536-well microtiter plate with a film-bottom compatible with acoustic sample printing. An array of 2 nL sample droplets was transferred to an MS substrate and allowed to dry. The MS substrate was analyzed in San Diego, Calif. on a Bruker Autoflex mass spectrometer within 4 hours of sample deposition. The resulting spectrum, shown in FIG. 15A, includes peaks corresponding to N-Desethylamodiaquine 500 and the internal standard 505. The MS substrate was then packaged in an environmentally controlled chamber consisting of a plastic holder to hold the substrate in place and to protect it from physical contact and a dehydrating cartridge just outside the plastic holder. These were then placed in a mylar film bag that was then evacuated with vacuum and heat sealed with a hot-strip. This sealed apparatus was shipped via ground transport to Fremont, Calif. Upon arrival in Fremont, Calif., the MS substrate was removed from the packaging for subsequent analysis. A second mass spectrum was acquired from the same sample array using a Bruker Ultraflex mass spectrometer. The resulting spectrum is shown in FIG. 15B and again includes peaks corresponding to N-Desethylamodiaquine 510 and the internal standard 515.

Example 9

An assay screen of starch digestion enzymes was performed. At a customer site, the reaction mixtures, including internal standards, were acoustically printed using a EDC Biosystems ATS acoustic printer, in an array of 800 um spot pitches, onto an electrochemically etched (using hydrofluoric acid) porous silicon 75 mm by 25 mm mass spectrometry chip coated with a thin film, secured in an SBS format chip holder for compatibility with the instrument. More than 6000 spots were printed, including at least 4 replicates of each of more than 1500 samples. The samples included more than 100 unique enzyme variants under 3 different conditions and time points of 0, 1, 12, 24, and 48 hours. Each spot was printed 4 times, spot on spot, at 5 nL to provide a sample volume of 20 nL per spot. A positional file was also produced at the customer site to relate spot location to a sample ID for each spot. The positional file included array identification information, barcode, and layout information including number of blocks, first spot offset position, number of rows and columns, and spot center to center distance (pitch); as well as spot specific information including, for each spot, block, row, column, sample identifier, and three experiment description parameters. Samples were blinded by using arbitrarily assigned numbers as sample identifiers, with the identity of the enzyme variants in each sample remaining under the exclusive control of the customer.

Figure 16:
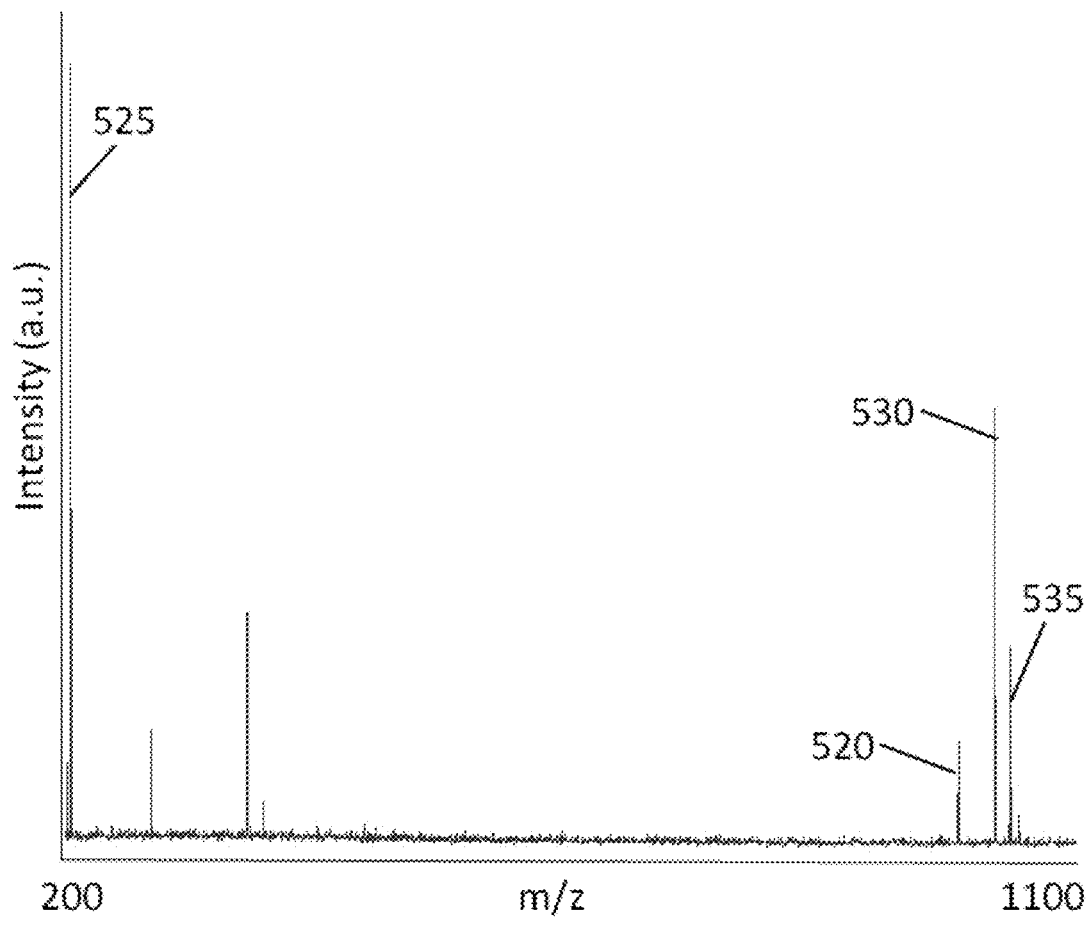
FIG. 16 shows a mass spectrum of sample including a blinded analyte with internal standards obtained after stability packaging and offsite transport.

The chip containing the array of samples was then packaged into a chip case (Electron Microscopy Services Plastic Single Slide Mailer Cat#71552-01). The chip case, containing the chip, was then placed into a mylar bag and the mylar bag was evacuated and sealed to hold a vacuum state within the bag. The bag, containing the chip and chip case, were then transported from the customer site approximately 2 miles to an off-site mass spectrometry facility. The chip was then un-packaged, placed onto a mass spectrometry chip holder in the same orientation as used during printing, loaded into a mass spectrometer. The positional file was electronically transported to the mass spectrometry site. The positional file was converted to a mass spectrometry positional file and loaded onto the mass spectrometer. The chip was positioned manually to the first spot to ensure correct register. The mass spectrometer then collected the data from the samples on the chip assigning the appropriate sample ID to the mass spectra according to the positional file information. These results were analyzed and presented to the customer. FIG. 16 shows a sample spectrum for one of the blinded samples, with a peak 520 corresponding to the analyte and demonstrating detection of the internal standards at m/z values of approximately 199 (tacrine 525), 1046 (angiotensin II 530), and 1060 (bradykinin 535).

Concluding Matter

Aspects and/or embodiments of the disclosure hereof include, without limitation and by way of example, any of the following, singly or in any operable combination:

In an aspect, there is provided a stability-packaged mass spectrometric (MS) array including a MS substrate having a plurality of MS samples applied thereon, an enclosure surrounding the MS samples, an environmental control system, and a protective barrier isolating the MS samples from physical contact.

In an aspect, a stability-packaged MS array includes a miniaturization of a sample library or subset thereof, and the packaging volume occupied by the MS samples and MS substrate is less than about 1/1000 the packaging volume of the sample library or subset thereof from which the MS samples were miniaturized.

In an aspect, a stability-packaged MS array includes MS samples located in a trackable position.

In an aspect, a stability-packaged MS array includes a sealed enclosure.

In an aspect, a stability-packaged MS array includes an enclosure that is fully or partially evacuated.

In an aspect, a stability-packaged MS array includes at least one of the MS samples immersed in a non-interactive gas or fluid, which may be a gas selected from: ultra-high purity (UHP) nitrogen, argon, or an inert gas.

In an aspect, a packaged MS substrate includes an environmental control system disposed and configured to condition an aspect of the environment proximate to the MS samples selected from the temperature, the humidity, the gas or fluid composition, or the particulate content, and may include a desiccant or humidity control device and/or a contaminant-suppressant composition or package and indicate adverse conditions during shipping.

In an aspect, a stability-packaged MS array includes at least one MS sample present in a quantity insufficient for NMR determination of the precise chemical structure of the MS sample.

In an aspect, a stability-packaged MS array includes MS samples disposed on an MS substrate at a center-to-center distance of less than about 500 microns, and/or at a volume less than about 500mL.

In an aspect, a stability-packaged MS array includes at least one MS sample disposed on the MS substrate at an analyte concentration of less than about 10 mg/mL.

In an aspect, a stability-packaged MS array includes at least one MS sample disposed on the MS substrate at an analyte concentration of less than about 1 ng/mL.

In an aspect, a stability-packaged MS array includes at least one MS sample disposed on the MS substrate at an analyte concentration of less than about 1 fg/mL.

In an aspect, a stability-packaged MS array includes at least one MS sample including analyte molecules having mass less than about 3,000 Daltons.

In an aspect, a stability-packaged MS array includes at least one MS sample including analyte molecules having mass less than about 30,000 Daltons.

In an aspect, a stability-packaged MS array includes at least one MS sample including analyte molecules having mass less than about 300,000 Daltons.

In an aspect, a stability-packaged MS array includes at least one MS sample including molecules conforming to Lipinski's Rule of Five.

In an aspect, a stability-packaged MS array includes at least one MS sample including an analyte selected from: animal metabolites, human metabolites, microbial metabolites, plant metabolites, or drug metabolites, and/or derived from a source selected from: urine, blood, cerebrospinal fluid, or tissue.

In an aspect, a stability-packaged MS array includes MS samples that are not captured or covalently bound to the MS substrate.

In an aspect, a stability-packaged MS array includes MS samples that are blinded and/or present in quantities below the threshold for practicable NMR determination of structure.

In an aspect, a MS substrate is mounted in a mounting frame.

In an aspect, a MS substrate or mounting frame includes a fiducial mark.

In an aspect, a MS substrate or a mounting frame in which it is mounted has dimensions compatible with a standard SBS footprint or a standard microscope slide footprint.

In an aspect, a stability-packaged MS array includes a quality control standard.

In an aspect, a MS substrate includes a sample-accepting surface selected from: a conductive surface, a stainless steel surface, a semiconductor surface, a silicon surface, an etched silicon surface, a liquid coated silicon surface, a glass surface, a plastic surface, or a gold surface.

In an aspect, a stability-packaged MS array includes a barrier configured and disposed to protect the MS samples thereon from exposure to light.

In an aspect, there is provided a method of packaging a MS substrate having a plurality of MS samples applied thereto, the method including enclosing the MS samples in an enclosure, establishing a substantially water-vapor-free, particulate-free environment proximate to the MS samples, and protecting the MS samples from physical contact.

In an aspect, a method includes packaging a MS array according to the disclosure hereof and dispatching the packaged MS array for offsite transport.

In an aspect, a method includes receiving information including a MS characteristic of at least one of the MS samples determined by a MS analysis performed at an offsite location.

In an aspect, a method includes packaging an MS array in an enclosure and fully or partially evacuating the enclosure and/or disposing an inert gas or fluid within the enclosure and/or disposing a desiccant in diffusive communication with a gas or fluid proximate to the MS sample.

In an aspect, there is provided a method of using a stability-packaged MS array which may include any one or more of: dispatching the stability-packaged MS array for offsite transport; receiving the stability-packaged MS array at a location offsite from the location at which MS samples were applied to the MS array; removing the MS array from its packaging; using the stability-packaged MS array for performing offsite MS analysis; using the stability-packaged MS array for engaging in the business of performing offsite MS analysis for customers; recording data or results of offsite MS analysis performed on the MS array; communicating data or results of offsite MS analysis performed on the MS array; receiving data or results from offsite MS analysis performed on the MS array; and/or analyzing data or results from offsite MS analysis performed on the MS array.

In an aspect, there is provided a data management system for offsite MS analysis including a plurality of MS data records each including a tracking identifier and an MS characteristic determined by offsite MS analysis of an MS sample with which the tracking identifier is associated, and a data store in which the plurality of MS data records are stored and operable for retrieving data stored therein associated with a tracking identifier.

In an aspect, a data management system includes a user interface disposed and configured to obtain input of a query including a tracking identifier, transmit the tracking identifier to the data store, and receive and communicate to a user data retrieved from the data store associated with the tracking identifier.

In an aspect, a data management system includes a data store selected from: a relational database, an object-oriented database or data structure, a no-SQL database, a cloud-based data storage utility, an XML or SGML-based data structure, a JSON data structure, a flat file; or a spreadsheet file.

In an aspect, a data management system includes MS data records in a format operable for merging with a data store of a customer entitled to the results of an offsite MS analysis.

In an aspect, there is provided a non-transitory machine-readable medium having data written thereon including a plurality of MS data records, each MS data record including a tracking identifier and an MS characteristic determined by offsite MS analysis of an MS sample with which the tracking identifier is associated.

In an aspect, a non-transitory machine-readable medium has data written thereon in a format operable for merging with a data store of a customer entitled to the results of an offsite MS analysis.

In an aspect, a method includes any or all of: at a loading site, preparing a MS array by applying MS samples to trackable loci on a MS substrate by non-contact deposition, associating with the trackable loci tracking identifiers corresponding to the MS samples applied thereto, packaging and transporting the MS array, performing at an MS analysis site that is offsite from the loading site a MS measurement to determine a MS characteristic of at least one of the MS samples, and, in a record, associating the MS characteristic of the at least one MS sample with the tracking identifier corresponding to the at least one MS sample.

In an aspect, a method includes protecting MS samples applied to an MS array against alteration.

In an aspect, protecting MS samples against alteration may include protecting the MS samples against contaminants, moisture, particulates, and/or changes in hydration; fully or partially enclosing the MS samples within an enclosure that is fully or partially impervious to a substance selected from: a particulate, a gas, a vapor, or an aerosol; packaging the MS array in a package including a physical barrier disposed to establish a gap between the MS samples and the physical barrier; and/or packaging the MS array in a package including an environmental control system.

In an aspect, applying a plurality of MS samples to trackable loci on a MS substrate includes a method of application selected from: non-contact deposition, acoustic deposition, contact printing, piezo printing, pipette printing, or ink jet printing.

In an aspect, a method includes measuring or observing a quality control property of the MS substrate or an MS sample thereon.

In an aspect, a method includes analysis of MS samples obtained from a sample library where the library is not accessible at the MS analysis site.

In an aspect, a method includes MS measurement performed using an MS instrument that is not accessible at the sample loading site.

In an aspect, a stability-packaged MS array is transported via a transport modality selected from: common carrier transport, transport in the U.S. mail, transport by a freight forwarder, transport by a package express carrier, transport by a courier, transport by aircraft, or transport by a motor vehicle.

In an aspect, there is provided a system for offsite MS analysis including a MS substrate having a plurality of MS samples applied thereon at trackable loci and a record or data set including, for each MS sample, a descriptor of the position of the trackable locus and a non-informative tracking identifier uniquely identifying the MS sample.

In an aspect, a descriptor of the position of the trackable locus of an MS sample includes a descriptor of the position of the trackable locus relative to at least one physical characteristic of the MS substrate or a mounting frame on which the MS substrate is mounted, which may be a fiducial mark.

In an aspect, a record or dataset includes, for an MS sample, a descriptor of the position of the center of the MS sample relative to the at least one fiducial point, and the diameter of the MS sample.

In an aspect, a descriptor of the position of the trackable locus of an MS sample includes a descriptor of the position of the MS sample relative to one or more other MS samples.

In an aspect, a MS record or dataset is written on a non-transitory machine-readable medium in a file or data structure compatible with positioning control software of an instrument selected from: an acoustic application instrument, a moveable stage, a laboratory robotics instrument, or a MS instrument.

For clarity and to ensure completeness, certain of the aspects and/or embodiments disclosed herein may be overlapping in scope, described repetitively, or represent recitals of the same or equivalent elements or combinations expressed in alternative language. It will be apparent that the choice of particular phraseology and/or of particular aspects or elements to assert as claims involves many complex technical and legal considerations, and no inference should be drawn that alternative descriptions of a particular element or combination in this written description necessarily encompass different subject matter.

It is intended that this specification be interpreted in accordance with the normal principles of English grammar and that words and phrases be given their ordinary English meaning as understood by persons of skill in the pertinent arts except as otherwise explicitly stated. If a word, term, or phrase is intended to be further characterized, specified, or narrowed in some way, then additional adjectives, modifiers, or descriptive text have been included in accordance with the normal principles of English grammar. It is intended that the meanings of words, terms, or phrases should not be modified or characterized in a manner differing from their ordinary English meaning as understood by persons of skill in the relevant arts except on the basis of adjectives, modifiers, or descriptive text that is explicitly present.

Except as otherwise explicitly stated, terms used in this specification, including terms used in the claims and drawings, are intended as "open" terms. That is, for example, the words "including" and "comprising" should be interpreted to mean "including but not limited to," the word "having" should be interpreted to mean "having at least," the word "includes" should be interpreted to mean "includes but is not limited to," the phrases "for example" or "including by way of example" should be interpreted as signifying that the example(s) given are non-exhaustive and other examples could be given, and other similar words and phrases should be given similar non-exclusive meanings In the written description and appended claims, the indefinite articles "a" and/or "an" are intended to mean "at least one" or "one or more" except where expressly stated otherwise or where the enabling disclosure requires otherwise. The word "or" as used herein is intended to mean "and/or", except where it is expressly accompanied by the word "either", as in "either A or B". Applicants are aware of the provisions of 35 U.S.C. §112, ¶ 6. The use of the words "function," "means" or "step" in the written description, drawings, or claims herein is not intended to invoke the provisions of 35 U.S.C. §112, ¶ 6, to define the invention. To the contrary, if the provisions of 35 U.S.C. §112, ¶ 6 are sought to be invoked, the claims will expressly include one of the exact phrases "means for performing the function of" or "step for performing the function of". Moreover, even if the provisions of 35 U.S.C. §112, ¶ 6 are explicitly invoked to define a claimed invention, it is intended that the claims not be limited only to the specific structure, material or acts that are described in the preferred embodiments, but in addition, extend to any and all structures, materials or acts that perform the claimed function as described in alternative embodiments or forms of the invention, or that are well known present or later-developed equivalent structures, material or acts for performing the claimed function.

Any of the methods of the present disclosure may be implemented in whole or part in hardware, software, or both, or by a computer program, and may be carried out using any of the disclosed devices or apparatus according to any aspect or embodiment of the present invention, or in any other operable manner.

In the foregoing description, various details, specific aspects, embodiments, and examples have been described in order to illustrate and explain the subject matter, to provide a thorough understanding of the various aspects, to enable persons skilled in the pertinent arts to practice the described subject matter, and to disclose the best mode of doing so known to applicants. These details, specific aspects, embodiments, and examples are not intended to be limiting; rather, it will be apparent to persons of skill in the relevant arts that, based upon the teachings herein, various changes, substitutions, modifications, rearrangements, may be made and various aspects, components, or steps may be omitted or added, without departing from the subject matter described herein and its broader aspects. Except as otherwise expressly stated or where aspects or features are inherently mutually exclusive, aspects and features of any embodiment described herein may be combined with aspects and features of any one or more other embodiments. The appended claims are intended to encompass within their scope any and all changes, substitutions, modifications, rearrangements, combinations of aspects or features, additions, and omissions that are within the spirit and scope of the subject matter as described herein and/or within the knowledge of a person of skill in the art. The scope of the invention is defined by the claims, and is not limited by or to the particular embodiments or aspects chosen for detailed exposition in the foregoing description, but rather extends to all embodiments or aspects as defined by the claims, as well as any equivalents of such embodiments or aspects, whether currently known or developed in the future.

So as to reduce the complexity and length of the detailed description, and to provide background in certain areas of technology, each of the materials identified in the "REFERENCES" section below is expressly incorporated by reference. Applicants believe that the subject matter incorporated is "non-essential" in accordance with 37 CFR 1.57, because it is referred to for purposes of indicating the background of the invention or illustrating the state of the art. However, if the Examiner concludes that any of the incorporated material constitutes "essential material" within the meaning of 37 CFR 1.57(c)(1)-(3), applicants will amend the specification to expressly recite the essential material that is incorporated by reference as allowed by the applicable rules.

REFERENCES

1. Northen, Trent R; Yanes, Oscar; Northen, Michael T; Marrinucci, Dena C; Uritboonthai, Winnie; Apon, Junefredo; Golledge, Stephen L; Nordström, Anders; Sizudak, Gary. Clathrate Nanostructures for Mass Spectrometry. Nature (2007) 449, 1033-1036.
2. Woo H-K., Northen T. R., Yanes O., Siuzdak G. Nanostructure-Initiator Mass Spectrometry (NIMS): A protocol for preparing and applying NIMS surfaces for high sensitivity mass analysis. Nature Protocols 3, 1341-1349 (2008).
3. Nordström, Anders; Want Elizabeth; Northen, Trent; Gieschen, Anderew; Fisher, Steven; Siuzdak, Gary. A Multiple Ionization Mass Spectrometry Strategy Used to Reveal the Complexity of Metabolomics. Analytical Chemistry, (2008), 80, 421-429.
4. Northen Trent R, Lee J-C, Hoang L., Raymond J., Hwang D-R, Yannone S. M., Wong C-H, Siuzdak G. A Nanostructure-Initiator Mass Spectrometry Based Enzyme Activity Assay, PNAS, (2008) 105(10), 3678-3683.
5. Reindl, Wolfgang; Northen, Trent. Rapid Screening of Fatty Acids Using Nanostructure-Initiator Mass Spectrometry. Analytical Chemistry (2010), 9, 3751-3755.
6. Yanes Oscar; Woo, Hin-Koon; Northen, Trent; Oppenheimer, Stacey; Schriver, Leah; Apon, Jon; Estrada, Myra; Potchoiba, Michael; Manchester, Marianne; Siuzdak, Gary. Nanostructure-Initiator Mass Spectrometry (NIMS) Tissue Imaging and Biofluid Analysis. Analytical Chemistry (2009), 81 (8), 2969-2975.
7. Wolfgang Reindl, Kai Deng, John M. Gladden, Gang Cheng, April Wong, Steven W. Singer, Seema Singh, Jinq-Chyi Lee, Chun-Hsu Yao, Terry C. Hazen, Anup K. Singh, Blake A. Simmons, Paul D. Adams and Trent R. Northen. Colloid-based multiplexed screening for plant biomass-degrading glycoside hydrolase activities in microbial communities. Energy and Envir. Sci. (2011), 4, 2884-2893.
8. Greving M, Cheng K, Reindl W, Bowen B, Deng D, Louie K, Nyman M, Cohen J, Singh A, Simmons B, Adams P, Siuzdak G, and Northen T Acoustic deposition with NIMS as a high throughput enzyme activity assay, Anal Biochemistry 2012
9. Ban, L. and M. Mrksich. 2008. On-chip synthesis and label-free assays of oligosaccharide arrays. Angew Chem Int Ed 47:3396-3399.
10. Cornett, D. S., M. L. Reyzer, P. Chaurand, and R. M. Caprioli. 2007. MALDI imaging mass spectrometry: molecular snapshots of biochemical systems. Nature Methods 4:828-833.
11. Winograd, N. 2005. The Magic of Cluster SIMS. Anal. Chem. 77:142 A-149A 12. Wiseman, J. M., D. R. Ifa, Q. Song, and R. G. Cooks. 2006. Tissue imaging at atmospheric pressure using desorption electrospray ionization (DESI) mass spectrometry. Angew Chem Int Ed Engl 45:7188-7192.
13. McCombie, G. and R. Knochenmuss. 2004. Small-molecule MALDI using the matrix suppression effect to reduce or eliminate matrix background interferences. Anal. Chem. 76:4990-4997.
14. Stolee, J. A., Walker, B. N., et al. 2012. Laser-nanostructure interactions for ion production. Phys. Chem. Chem. Phys., PMID 22415633.
15. Shen, Z., Go, E. P., et al. 2004. A Mass Spectrometry Plate Reader: Monitoring Enzyme Activity and Inhibition with a Desorption/Ionization on Silicon (DIOS) Platform. ChemBioChem 5:921-927.

We claim:

1. A stability-packaged mass spectrometric (MS) array comprising:
   a MS array comprising a MS substrate having a plurality of MS samples applied thereon;
   an enclosure surrounding the MS samples;
   an environmental control system; and
   a protective barrier isolating the MS samples from physical contact;
   wherein the MS array is operable for performing laser desorption ionization (LDI) of the samples in situ on the MS array upon de-packaging and without further sample preparation;
   and wherein the MS samples are of differing composition and disposed on the MS substrate at a center-to-center distance less than about 500 microns.

2. The stability-packaged MS array of claim 1, wherein the MS samples are located in trackable positions.

3. The packaged MS substrate of claim 1, wherein the environmental control system is adapted and configured to condition an aspect of the environment proximate to the MS samples selected from: the temperature, the humidity, the gas or fluid composition, or the particulate content.

4. The stability-packaged MS array of claim 1, wherein at least one MS sample comprises molecules conforming to Lipinski's Rule of Five.

5. The stability-packaged MS array of claim 1, wherein the volume of an MS sample applied to a MS substrate is less than about 1 µL.

6. The stability-packaged MS array of claim 1, wherein the protective barrier is positioned to establish a gap between the protective barrier and the MS samples and to prevent contact between the enclosure and the MS samples.

7. The stability-packaged MS array of claim 1, wherein the MS samples are not disposed in individual containers or wells.

8. A method of packaging a MS substrate having a plurality of MS samples applied thereto, the method comprising:
   enclosing the MS samples in an enclosure;
   establishing a substantially water-vapor-free, particulate-free environment proximate to the MS samples; and
   protecting the MS samples from physical contact;
   wherein the MS substrate having a plurality of MS samples applied thereto is operable for performing LDI ionization of the samples in situ on the MS substrate upon de-packaging and without further sample preparation; and wherein the MS samples are of differing composition and disposed on the MS substrate at a center-to-center distance less than about 500 microns.

9. A method comprising:
   by the method of claim 8, packaging a MS substrate having a plurality of MS samples applied thereto; and
   dispatching the packaged MS substrate for offsite transport.

10. The method of claim 9, further comprising receiving information comprising a MS characteristic of at least one of the MS samples determined by a MS analysis performed at an offsite location on the MS substrate after it has been packaged according to the method of claim 8 and transported to the offsite location.

11. A method of using the stability-packaged MS array of claim 1, comprising dispatching the stability-packaged MS array for offsite transport.

12. A method of using the stability-packaged MS array of claim 1, comprising receiving data or results from offsite MS analysis performed on the MS array after the stability-packaged MS array has been transported to the offsite MS analysis site.

13. A method of using the stability-packaged MS array of claim 1, comprising analyzing data or results from offsite MS analysis performed on the MS array after the stability-packaged MS array has been transported to the offsite MS analysis site.

14. A method comprising:
   at a loading site, preparing a MS array by applying a plurality of MS samples to trackable loci on a MS substrate by non-contact deposition;
   associating with each trackable locus a tracking identifier corresponding to a MS sample applied to the trackable locus;
   packaging and transporting the MS array;
   de-packaging the MS array;
   at an MS analysis site that is offsite from the loading site, performing a MS measurement to determine a MS characteristic of at least one of the MS samples; and
   in a record, associating the MS characteristic of the at least one MS sample with the tracking identifier corresponding to the at least one MS sample;
   wherein the MS array is operable for performing LDI ionization of the samples in situ on the MS substrate upon de-packaging and without further sample preparation; and wherein
   the MS samples are of differing composition and disposed on the MS substrate at a center-to-center distance less than about 500 microns.

15. The method of claim 14, further comprising protecting the MS samples against alteration.

16. The method of claim 15, wherein protecting the MS samples against alteration comprises protecting the MS samples against contaminants.

17. The method of claim 15, wherein protecting the MS samples against alteration comprises fully or partially enclosing the MS samples within an enclosure that is fully or partially impervious to a substance selected from: a particulate, a gas, a vapor, or an aerosol.

18. The method of claim 15, wherein protecting the MS samples against alteration comprises packaging the MS array in a package comprising a physical barrier disposed to establish a gap between the MS samples and the physical barrier.

19. The method of claim 14, wherein applying a plurality of MS samples to trackable loci on a MS substrate comprises a method of application selected from: non-contact deposition, acoustic deposition, contact printing, piezo printing, pipette printing, or ink jet printing.

20. The method of claim 14, wherein the MS measurement is performed using an MS instrument that is not accessible at the loading site.

21. The method of claim 14, wherein transporting the stability-packaged MS array comprises transport selected from:

common carrier transport, transport in the U.S. mail, transport by a freight forwarder, transport by a package express carrier, transport by a courier, transport by aircraft, or transport by a motor vehicle.

\* \* \* \* \*